(12) United States Patent
Vestergaard Frandsen et al.

(10) Patent No.: US 11,285,707 B2
(45) Date of Patent: Mar. 29, 2022

(54) LIGHTER-THAN-AIR VEHICLE WITH A HULL, A LAMINATE FOR SUCH HULL AND A METHOD OF PRODUCTION OF SUCH LAMINATE

(71) Applicant: SCEYE Sàrl, Lausanne (CH)

(72) Inventors: Mikkel Vestergaard Frandsen, New York, NY (US); David Kim, Durham, NC (US); Philip David Bradford, Apex, NC (US); Abdel-Fattah Mohamed Seyam, Cary, NC (US); Rahul Vallabh, Raleigh, NC (US); Ang Li, Raleigh, NC (US)

(73) Assignee: SCEYE SA, Lausanne (CH)

( * ) Notice: Subject to any disclaimer, the term of this patent is extended or adjusted under 35 U.S.C. 154(b) by 0 days.

(21) Appl. No.: 16/344,132

(22) PCT Filed: Oct. 23, 2017

(86) PCT No.: PCT/EP2017/077009
§ 371 (c)(1),
(2) Date: Apr. 23, 2019

(87) PCT Pub. No.: WO2018/077806
PCT Pub. Date: May 3, 2018

(65) Prior Publication Data
US 2020/0307169 A1     Oct. 1, 2020

Related U.S. Application Data

(60) Provisional application No. 62/411,764, filed on Oct. 24, 2016.

(51) Int. Cl.
B32B 27/08      (2006.01)
B32B 27/30      (2006.01)
(Continued)

(52) U.S. Cl.
CPC ............ *B32B 27/08* (2013.01); *B32B 27/306* (2013.01); *B64B 1/58* (2013.01); *B32B 27/12* (2013.01);
(Continued)

(58) Field of Classification Search
None
See application file for complete search history.

(56) References Cited

U.S. PATENT DOCUMENTS 4,943,473 A * 7/1990 Sahatjian ............. A41D 27/245
                                                    442/289
5,082,721 A * 1/1992 Smith, Jr. ............. A62B 17/006
                                                        2/81

(Continued)

FOREIGN PATENT DOCUMENTS

CN     104169082 A     11/2014
CN     104742469 A     7/2015
(Continued)

OTHER PUBLICATIONS

McDaniels et al.; "High Strength-to-Weight Ratio Non-Woven Technical Fabrics for Aerospace Applications"; Cubic Tech Corp., Copyright 2009.
(Continued)

*Primary Examiner* — Ramsey Zacharia
(74) *Attorney, Agent, or Firm* — James Creighton Wray

(57) ABSTRACT

A lighter than air vehicle with a hull, a laminate for such hull and a method of production of such laminate A lighter-than-air vehicle comprising a hull of a laminate material with a reinforcing fibre layer, for example Zylon®, and a first, and optionally second, Ethylene Vinyl Alcohol film melt-bonded into the fibre layer. A weathering layer protects the fibres against UV degradation.

23 Claims, 17 Drawing Sheets

Figure 3B:
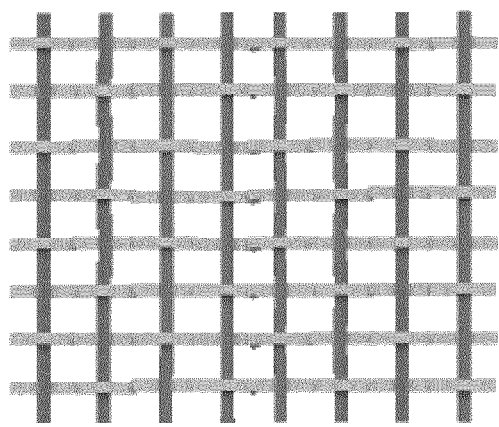
Figure 3B:
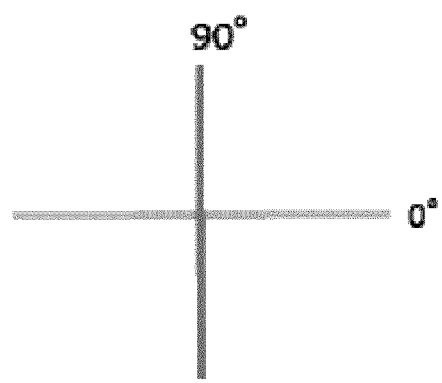

(51) Int. Cl.
  *B64B 1/58* (2006.01)
  *B32B 27/12* (2006.01)

(52) U.S. Cl.
  CPC ..... *B32B 2255/10* (2013.01); *B32B 2260/046* (2013.01); *B32B 2307/31* (2013.01); *B32B 2307/54* (2013.01); *B32B 2307/548* (2013.01); *B32B 2307/5825* (2013.01); *B32B 2307/71* (2013.01); *B32B 2307/712* (2013.01); *B32B 2307/7244* (2013.01); *B32B 2605/00* (2013.01); *B32B 2605/18* (2013.01)

(56) References Cited

U.S. PATENT DOCUMENTS

| | | | |
|---|---|---|---|
| 5,853,862 | A | 12/1998 | Murai |
| 6,074,722 | A | 6/2000 | Cuccias |
| 7,354,636 | B2 | 4/2008 | Lavan |
| 7,713,890 | B2 | 5/2010 | Vogt |
| 8,152,093 | B2 | 4/2012 | Liggett |
| 8,399,080 | B2 | 3/2013 | Chicarella |
| 8,524,621 | B2 | 9/2013 | Liggett |
| 2003/0228821 | A1* | 12/2003 | Zhu ............... D03D 1/0041 442/197 |
| 2007/0128963 | A1 | 6/2007 | Vogt |
| 2007/0281570 | A1 | 12/2007 | Liggett |
| 2009/0042037 | A1 | 2/2009 | Liggett |
| 2010/0239797 | A1 | 9/2010 | Alavi |
| 2011/0171489 | A1 | 7/2011 | Dou |
| 2017/0010072 | A1* | 1/2017 | Sriraman ............ F41H 5/0478 |

FOREIGN PATENT DOCUMENTS

| | | |
|---|---|---|
| JP | 2001239605 A | 9/2001 |
| JP | 2007320313 A | 12/2007 |
| UA | 102997 C2 | 9/2013 |
| WO | 2014009314 A1 | 1/2014 |

OTHER PUBLICATIONS

Stockbridge et al.; "Airship Research and Development in the Areas of Design, Structures, Dynamics and Energy Systems"; International Journal of Aeronautical & Space Science, 2012, pp. 170-187.
Maekawa and Yoshino, "Tear propagation of a High-performance Airship Envelope Material", Journal of Aircraft vol. 15, No. 5, Sep.-Oct. 2008, only p. 1546 submitted/considered.
Zhai and Euler, "Material challenges for Lighter-Than-Air Systems in High Altitude Applications" published by the American Institute of Aeronautics and Astronautics at the AIAA 5th Aviation, Technology, Integration, and Operations Conference (ATIO) Sep. 26-28, 2005, Arlington California.
Sales brochure of Eval Europe NV, a subsidiary of Kuraray Co. Ltd., the brochure being found on the Internet site http://eval-americas.com/media/15453/eval%20industrial%20application.pdf. Published 2007.

* cited by examiner

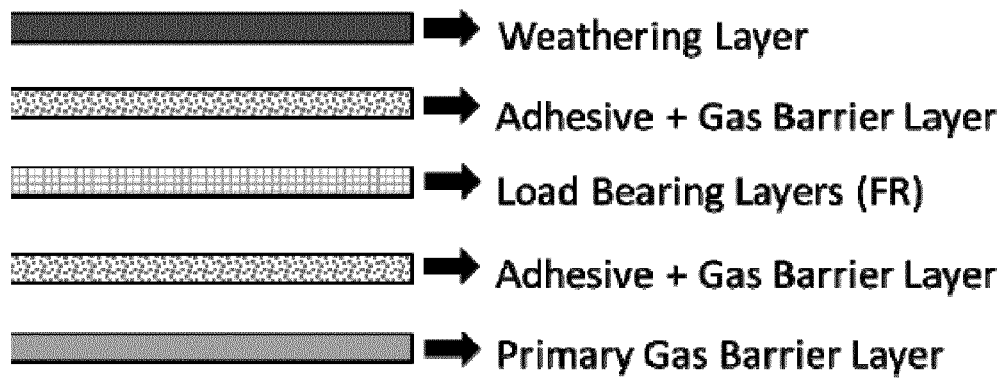
FIG. 1
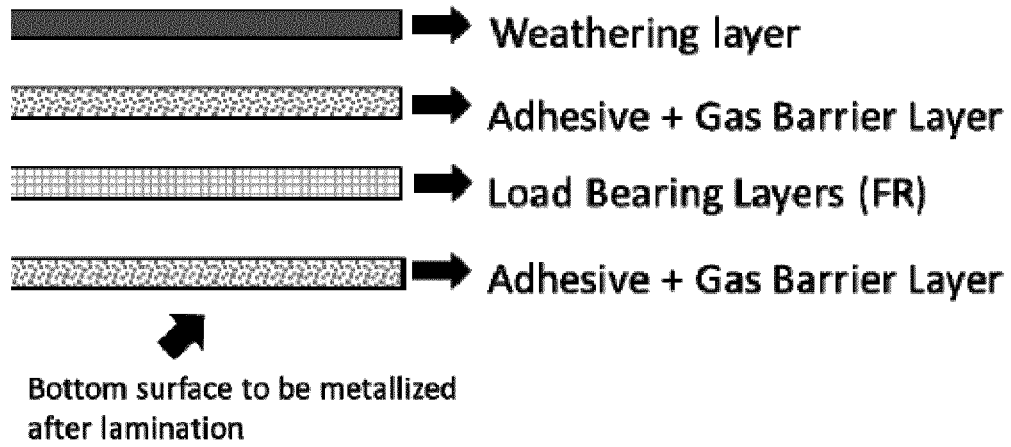
Bottom surface to be metallized after lamination
FIG. 2
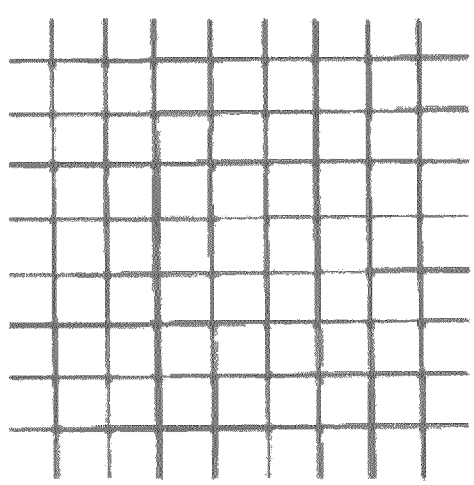
FIG. 3a
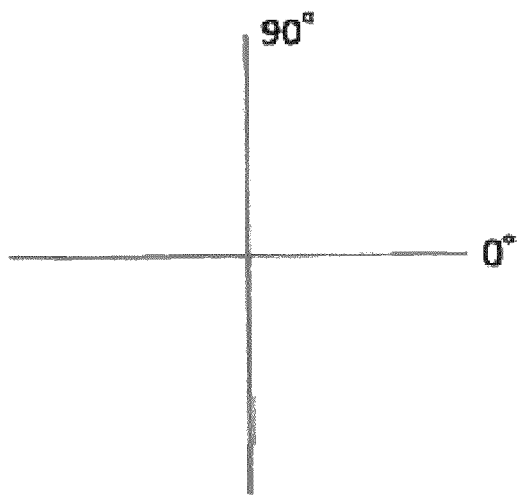

| | |
|---|---|
| 18 gsm | → 12.7 micron metallized Kapton® (PI) film |
| 15 gsm | → 12.5 micron EVOH film |
| 50 gsm | → Woven Fiber Reinforcement |
| 15 gsm | → 12.5 micron EVOH film |
| 7 gsm | → 4 micron metallized PET |

LIGHTER-THAN-AIR VEHICLE WITH A HULL, A LAMINATE FOR SUCH HULL AND A METHOD OF PRODUCTION OF SUCH LAMINATE

This application claims the benefit of U.S. Provisional Application No. 62/411,764 filed Oct. 24, 2016 and PCT/EP2017/077009 filed Oct. 23, 2017, International Publication No. WO 2018 077806 A1, which are hereby incorporated by reference in their entirety as if fully set forth herein.

FIELD OF THE INVENTION

The present invention relates to a lighter-than-air vehicle with a hull, a laminate for such hull and a method of production of such laminate. Especially, it relates to a multi-functional laminate with a reinforcing fibre layer and a gas barrier film.

BACKGROUND OF THE INVENTION

Lighter-than-air vehicles have a flexible hull that is filled with a gas, typically Helium. In case that the vehicle does not have an internal structural framework, it is also called a blimp, where the shape of the airship, typically elongate shape, is maintained by internal pressure. The hull has to be made of a laminate that is stable enough to not burst and which also functions as a gas barrier, typically for Helium, He, inside the hull.

Hull material for high-altitude lighter-than-air vehicles is subject to a number of requirements. It must be light-weight while at the same time provide mechanical stability. It has to chemically resist the aggressive atmosphere at high altitude, especially the ozone content in the air. It must also be UV resistant and be stable and flexible at high and low temperature. Although, materials are known for each of these requirements, the combination thereof implies a severe challenge for the development of hull materials.

U.S. Pat. No. 7,354,636 by Lavan et al, assigned to Lockheed Martin Corporation, discloses a laminate with a liquid crystal polymer fibre layer, for example Vectran®, a polyimide (PI) layer secured to the liquid crystal polymer fibre layer; and a polyvinylidene fluoride (PVDF) layer secured to the PI layer. The layers are secured to one another with a polyurethane (PU) adhesive. Adjacent laminates may be secured to one another by a PVDF cover tape on the exterior surfaces and a structural tape on the interior surfaces. The structural tape includes a liquid crystal polymer fibre layer and a PI layer to ensure the integrity of the vehicle. An alternative material may include a liquid crystal polymer fibre layer and a PVDF layer disposed on both sides of the liquid crystal polymer fibre layer. The weight is around 5 ounces per square yard (170 grams/square meter). The tensile strength is around 240 lbs per inch, corresponding to 420 N/cm.

Seeing that the payload capacity is directly related to the weight of the hull, it would be desirable to reduce the weight while keeping or even increasing the strength.

A better weight to strength ratio is found in the article "Tear propagation of a High-performance Airship Envelope Material" published by Maekawa and Yoshino in Journal of Aircraft Vol. 45, No. 5, September-October 2008. The disclosed material had a weight of 157 g/m$^2$ and a tensile strength of 997 N/cm. The laminate comprises Zylon® fibres for its base fabric. Zylon® is a trademark name of Toyobo Corporation for rigid-rod lyotropic liquid crystal polymer. In more detail, it is a thermoset liquid-crystalline polyoxazole, poly(p-phenylene-2,6-benzobisoxazole), also called PBO.

Zylon® (PBO) has a high specific strength as compared to other commercially available high performance fibres. Zylon® yarns also have high resistance to creep elongation and are therefore useful for fibre reinforcement (FR) in the laminate material. However, PBO is also known to be very susceptible to photo-degradation not only by UV but also by visible light. The presence of moisture and oxygen has been found to accelerate the photo-degradation. For these reasons, despite the apparent advantages in terms of high strength and low creep, other challenges go along with this fibre material when used for stratospheric airships.

Another hull material is disclosed in US patents U.S. Pat. No. 6,074,722 by Cuccias et al. assigned to Lockheed Martin, wherein the laminate is made of a fibrous layer laminated to plastic resin material. The fibrous layer is either a woven material or a multilayer of unidirectional filamentary material. Laminates with woven fabrics for airships are also disclosed in U.S. Pat. No. 7,713,890 by Vogt et al. assigned to Milliken & Company. Integration of electronic components in the hull layer is disclosed in U.S. Pat. No. 8,152,093 by Liggett et al. assigned to Lockheed Martin Corporation.

Various hull materials are discussed in the article "Material challenges for Lighter-Than-Air Systems in High Altitude Applications" by Zhai and Euler, published by the American Institute of Aeronautics and Astronautics at the AIAA 5$^{th}$ Aviation, Technology, Integration, and Operations Conference (ATIO) 26-28 Sep. 2005, Arlington Calif. This article discusses various materials for lighter-than-air ballonet materials, in particular materials for the gas retention layer as well as for the load-bearing woven structural layer, which takes up the load/stress. These layers are bonded to each other by an adhesive layer. Adhesive bonding is described with reference to polyurethane, epoxy and acrylic. For the gas retention layer, the article states low temperature flexibility as the most important parameter among various desirable properties, which also includes low gas permeability, minimal weight, good bondability, abrasion resistance, and ozone resistance. In table 5 of this article, ethylene vinyl alcohol copolymer (EVOH) is mentioned as having poor low temperature flexibility, indicating that EVOH is not suitable as ballonet or hull material for lighter-than-air airships at low temperatures, which are typically found at high altitudes. For this apparent reason, this article mentions instead polyolefin, polyurethane, ethylene propylene diene monomer (EPDM) rubber, and silicone rubber as the most promising polymeric materials for the gas retention layer.

Although, the article by Zhai and Euler indicates EVOH as not useful for high-altitude airships, indications are found that EVOH is useful when used in a sandwich layer together with polyurethanes, which are also regarded as promising material in the above article. Reference is made in this respect to the sales brochure of Eval Europe NV, a subsidiary of Kuraray Co. Ltd., the brochure being found on the Internet site http://eval-americas.com/media/15453/eval%20industrial%20application.pdf. In this brochure, great flexibility and excellent gas barriers are mentioned in addition to suitability at frigid atmospheric conditions for a coextruded film structure where EVOH resin (Eval™) is sandwiched between layers of thermoplastic polyurethane (TPU), the sandwich in short described as TPU/Eval™/TPU. One of the proposed uses of this sandwich film is as material for stratospheric dirigibles. This brochure indicates that a sandwiching of EVOH between two TPU films overcomes the disadvantage of the poor low-temperature flexibility of EVOH itself. However, for a light-weight hull material, which is essential for suitable lifting capacity of airships, the sandwiching of EVOH between TPU layers disadvantageously adds weight to the hull without optimizing the strength of the final hull material.

Accordingly, it appears that an optimum solution for a hull material has not yet been found. As a conclusion, although, numerous proposals are found in the prior art for airship hulls, there is still a steady need for improvements and optimization.

DESCRIPTION/SUMMARY OF THE INVENTION

It is therefore an objective of the invention to provide an improvement in the art. It is a further objective to provide a lighter-than-air vehicle with an improved hull. Specifically, the improved laminate hull is optimized with respect to weight relatively to strength as well as minimised gas permeability. These objectives are achieved with a lighter-than-air vehicle having a hull that comprises a laminate as described in more detail in the following.

The following abbreviations are used:
ypi (yarns per inch), 1 inch=2.54 cm, 1 ypi=1/(2.54) yarns per cm
tpi (twist per inch); tpm (twists per meter); 1 tpi=39 tpm
gsm (grams per square meter)
sqm (square meter)
UV-Vis weathering—degradation by exposure to UV radiation and/or visible light The laminate for the hull comprises a laminate material as a gas barrier and load bearing structure, the laminate comprising a reinforcing fibre layer and a first Ethylene Vinyl Alcohol, EVOH, film melt-bonded into the fibre layer on one side of the fibre layer, wherein the EVOH is in direct contact with the reinforcing fibre layer.

The term "direct contact" implies that no layer of other material is disposed between the EVOH layer and the fibre layer. Especially, the EVOH film is not provided as part of a composite film, where the EVOH is sandwiched between two TPU layers prior to melt-bonding it to the fibre layer.

Optionally, the laminate comprises a second EVOH film melt-bonded into the fibre layer on an opposite side of the fibre layer, wherein also the EVOH of the second EVOH film is in direct contact with the reinforcing fibre layer. In this case, the reinforcing fibre layer is sandwiched between a first and second film made of Ethylene Vinyl Alcohol, EVOH, which is melted into the fibre layer on either side.

EVOH has very low gas permeability for Helium, which is highly useful. It is UV stable and ozone resistant. Furthermore, it is heat sealable. The prior art statement of poor low temperature flexibility was experimentally not found as a problem when used alone or when used in the laminates that were provided with EVOH as gas barrier layer.

For the hull material, a first EVOH film melt-bonded onto and at least partially into the fibre layer from one side, and optionally a second EVOH film is melt-bonded onto and at least partially into the fibre layer from the opposite side of the fibre layer. Such melt bonding is achieved by heat-pressing the layers together. As an example, a temperature in the range of 175-180° C. is useful. In the laminate as described in the following paragraphs, the EVOH film not only serves as an adhesive for bonding the layers to each other, but also acts gas barrier. Thus, it serves as a multi-functional layer.

In order to provide high strength and light weight of the fibre reinforcement (FR) layer, liquid crystal fibres is a good candidate, for example Poly [p-phenylene-2, 6-benzobisoxazolel], PBO. Such fibres are marketed as Zylon® fibres, as already explained in the introduction.

In order to optimize strength and/or uniformity, it is advantageous in some cases to include at least one of twisted fibres, sized fibres and fibres that are both sized and twisted. Optionally, the sized fibres assist in additional bonding between the layers, especially if the sized material is compatible with the adhesive layer. Examples of sized material are certain PVA (poly-vinyl-acetate) fibres. Another example is fibres marketed under the trade name Exceval. For example sizing of the fibres is achieved by applying the sizing material as a spin finish to the fibres.

A suitable sizing agent is polyvinyl alcohol. Such agent is commercially available, for example from the Japanese company Kuraray® Co, Ltd. A hydrophobically modified polyvinyl alcohol with the trade name Exceval™ from Kuraray® has also been used experimentally with good results. Such sizing agents based on polyvinyl alcohol are highly elastic, chemically resistant and turned out to be compatible with EVOH. It was shown experimentally that the polyvinyl alcohol strengthened Zylon® yarns. It also provided better adhesion between the fabric and the EVOH.

For example, a first set of fibres in the fibre layer, optionally liquid crystal fibres, are twisted, whereas a second set of fibres in the fibre layer, optionally liquid crystal fibres, is not twisted.

In some embodiments, the two sets of fibres are arranged in different directions. For example, a first set of the fibres oriented in a first direction are twisted and a second set of fibres oriented in a second direction are not twisted. For example, the first and the second direction have an angle between the directions of at least 30 degrees, for example 45 degrees, optionally perpendicular. Good results have been achieved with twisted fibres that comprise a twist of between 30 and 50 twists per meter.

Both balanced and unbalanced fibrous layers are potentially useful. In some embodiments, the fibres in the second set of fibres are at least two times thicker than the first set of fibres. In some embodiments, the first set of fibres has a first thread density and the second set of fibres has a second thread density that differs from the first thread density by at least a factor of two.

For a lighter-than-air vehicle, where weight is crucial, experimental results were obtained for a fibre layer with a weight of between 40 and 70 g per sqm.

For example, the thickness of the EVOH layer is between 10 and 20 microns.

Advantageously, the laminate comprises a multi-functional weathering layer melt-bonded to the first EVOH layer, wherein the weathering layer comprises a metallized polymer film, having a single metal layer on only one side or, alternatively, on both sides of the polymer film. In case that the weathering layer has only a single metal layer, it is advantageously oriented with the metal layer towards the EVOH and melt-bonded onto the first EVOH film layer. This way, it is protected by the outwards-directed polymer, for example polyimide, of the weathering layer. Such weathering layer has to protect the hull against the reactive Ozone and other chemical attacks as well as protect the reinforcing fibre layer against UV radiation. As discussed initially, PBO, for example Zylon® degrades very quickly in UV light. In addition, it functions as an additional gas barrier. A good candidate for the polymer in the weathering layer is polyimide, PI. An example of an alternative material for this purpose is polyvinyl fluoride, PVF. For example, the thickness of the weathering layer is between 10 and 20 microns.

It is pointed out that the outwards-directed polymer layer also is useful for creating strong seems between adjacent laminates.

Although, EVOH is a good gas barrier, the gas tightness can be improved by adding a metallized gas barrier layer to the laminate on the inner side of the hull, which is opposite to the weathering layer. For this purpose the metallised gas barrier is optionally melt-bonded onto the second EVOH film. A candidate for the metallised polymer film layer is a polyethylene terephthalate, PET; for example a PET layer with a thickness of between 4 and 8 microns.

In experiments, it has been shown, as will also be described in greater detail below, that a gas tight and stable laminate could be made with a weight in the range between 90 and 110 gsm. For example, the tenacity-to-weight ratio for the laminate was experimentally found to above 890 kNm/kg.

In some embodiments, the fibre layer is a woven layer with a warp and a weft. For elongate blimps, the necessary strength in transverse direction of the hull is higher than in the longitudinal direction. Accordingly, the warp and weft, optionally, have filaments of different thickness and/or density. When using a non-crimp fibre layer, it is composed of a plurality of layers with unidirectional filaments, the different layers having different filament directions, for example perpendicular directions. Also in this case, the filaments in one direction are advantageously thicker and/or denser than in the second direction in order to optimise the strength without adding unnecessary weight.

It was found that both balanced and unbalanced structures were useful. Selection of balanced or unbalanced structures depends on the purpose. For example a higher strength may be desired in one direction as compared to the other. This is relevant for shape stability of the hull as well as minimization of weight, as unbalanced structures typically have a higher potential for optimized strength/weight ratios, seeing that the force on the fabric due to the elongate hull shape differs in the longitudinal the transverse direction.

As it appears from the above, the laminate includes a numerous layers, the combination of which is multi-functional. The functionality includes protection against UV radiation, visible light, ozone, singlet oxygen, and heat. The outermost layer also provides thermal management by having a low emissivity.

For ranges between a first and a second value, the first and second values are optionally included.

SHORT DESCRIPTION OF THE DRAWINGS

Figure 3C:
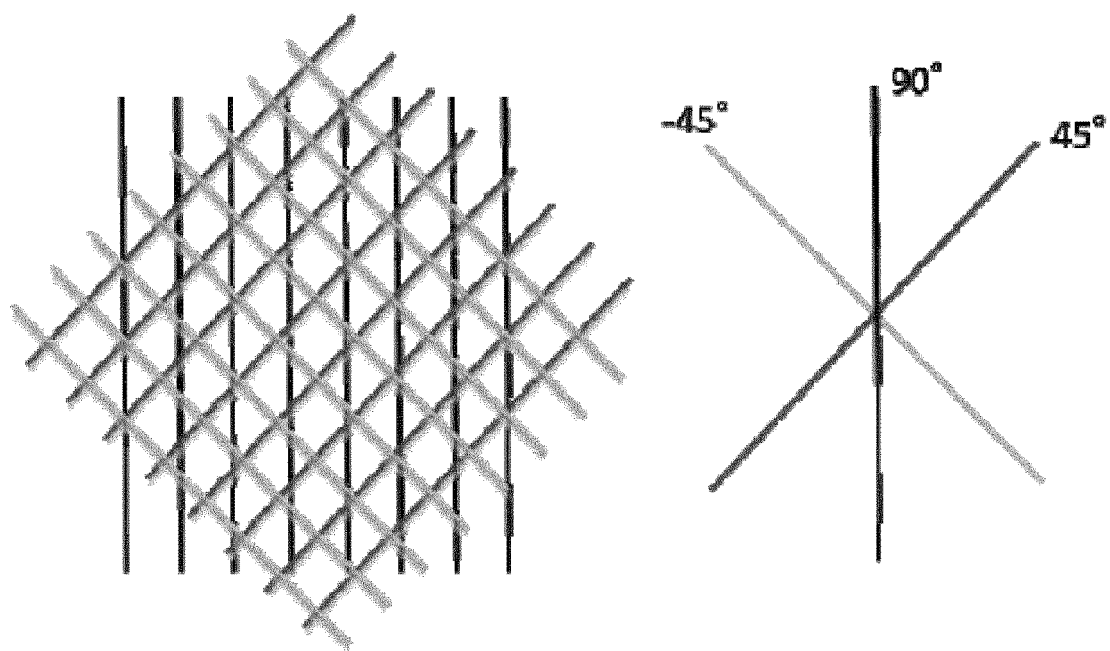
Figures 4A, 4B:
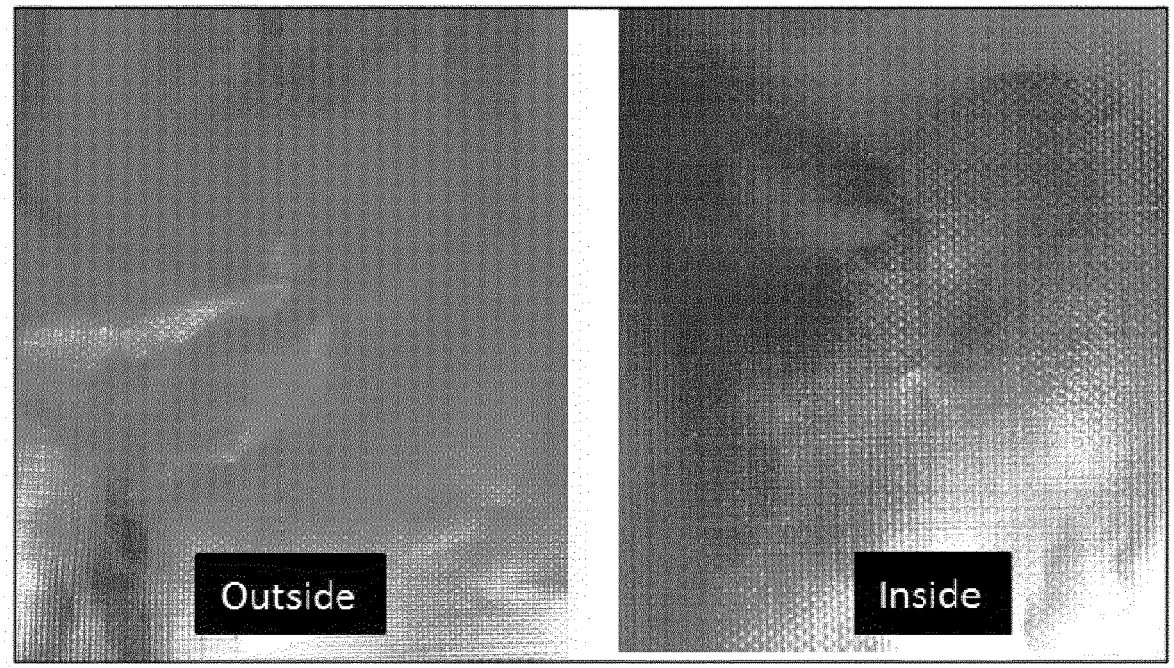
Figures 5A, 5B:
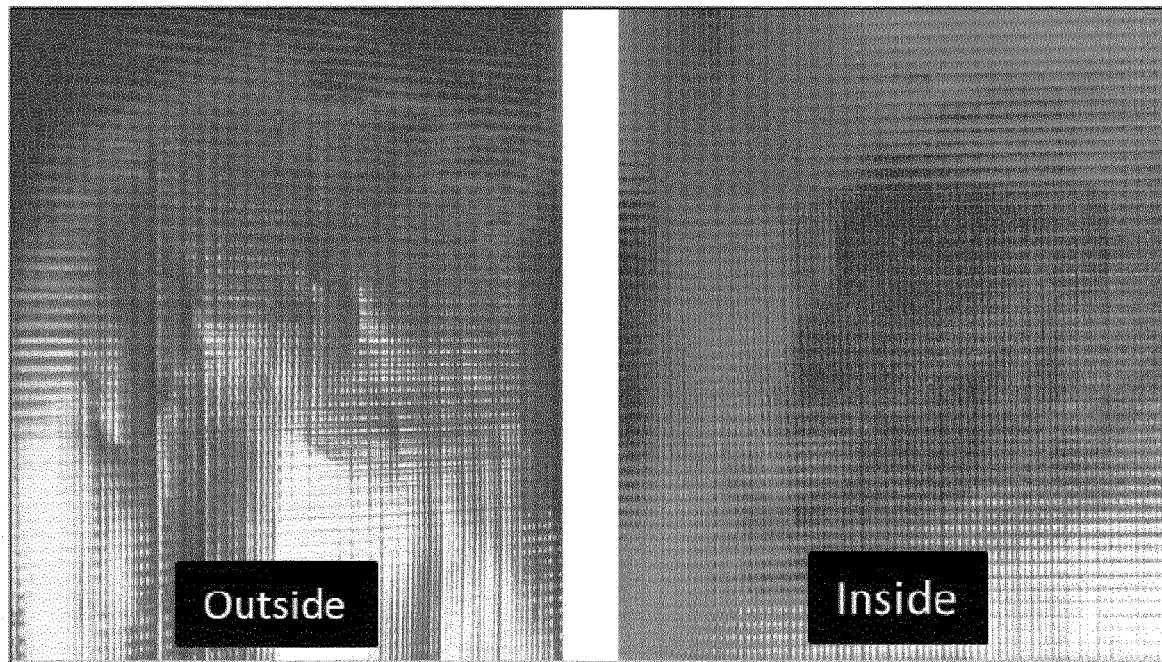
Figures 6A, 6B:
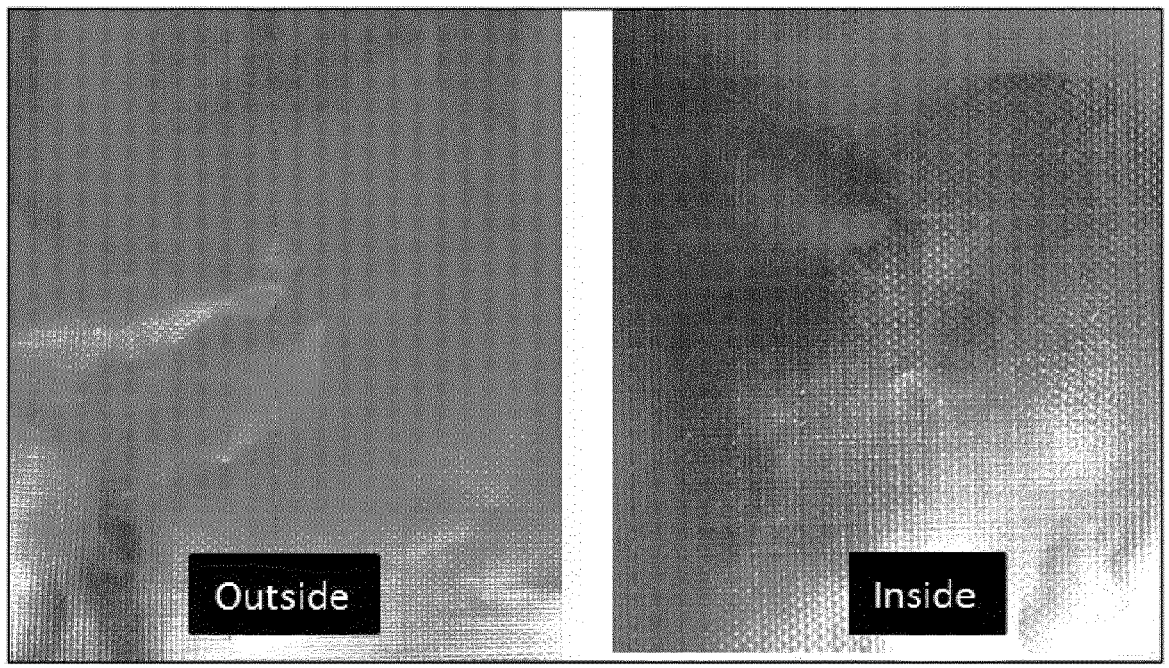
Figures 7A, 7B:
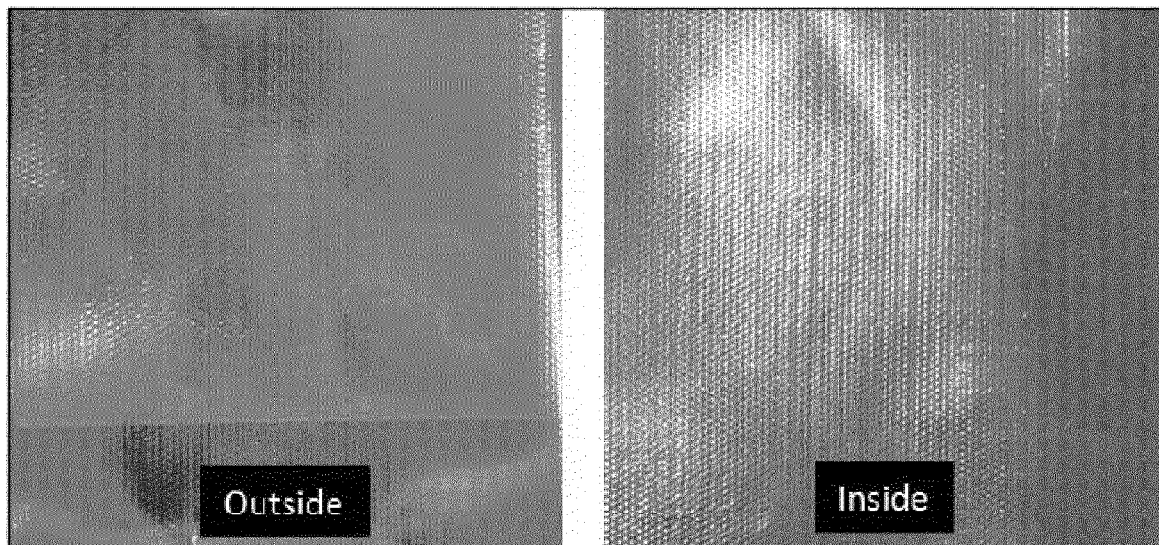
Figure 8:
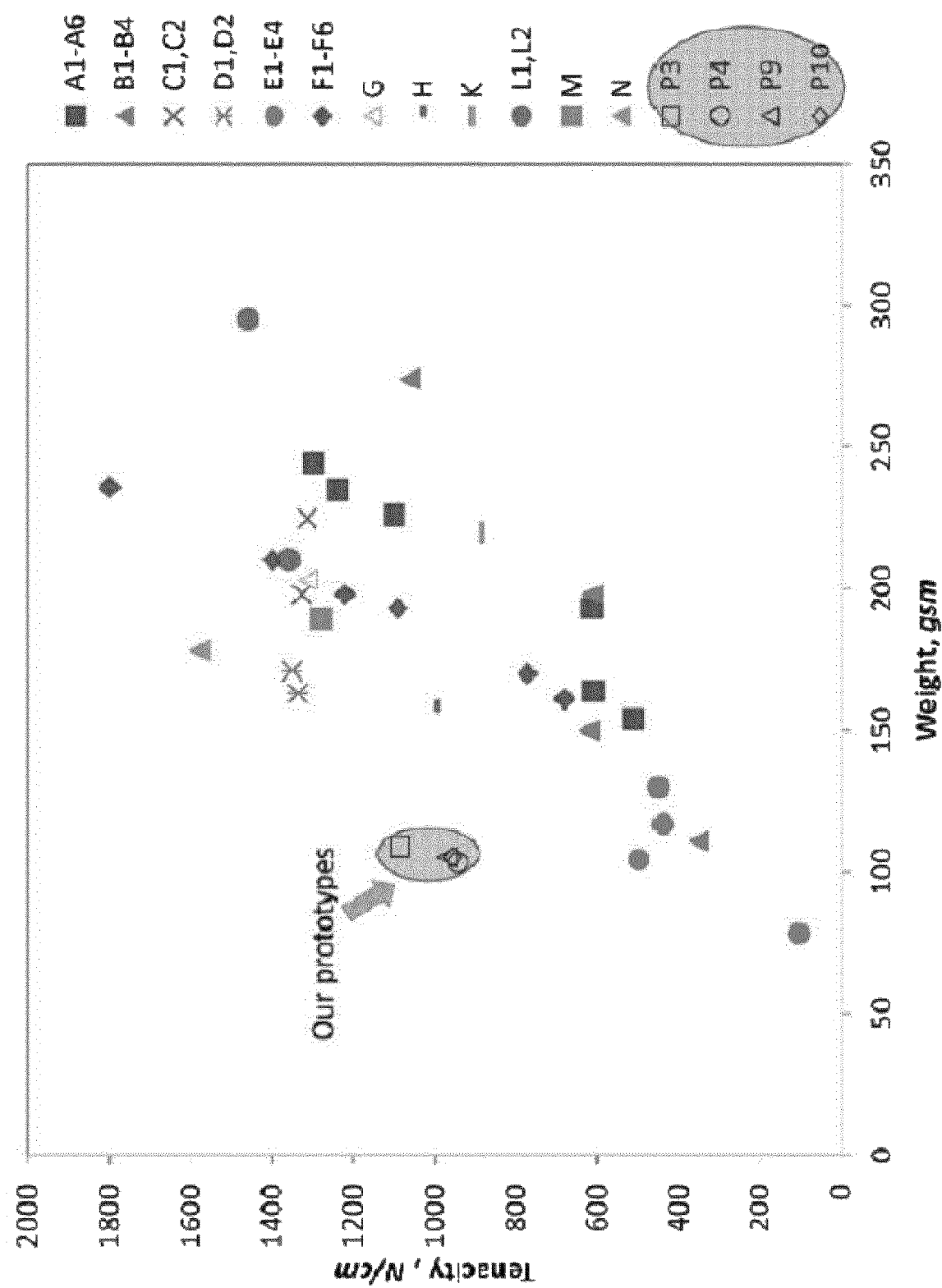
Figure 9:
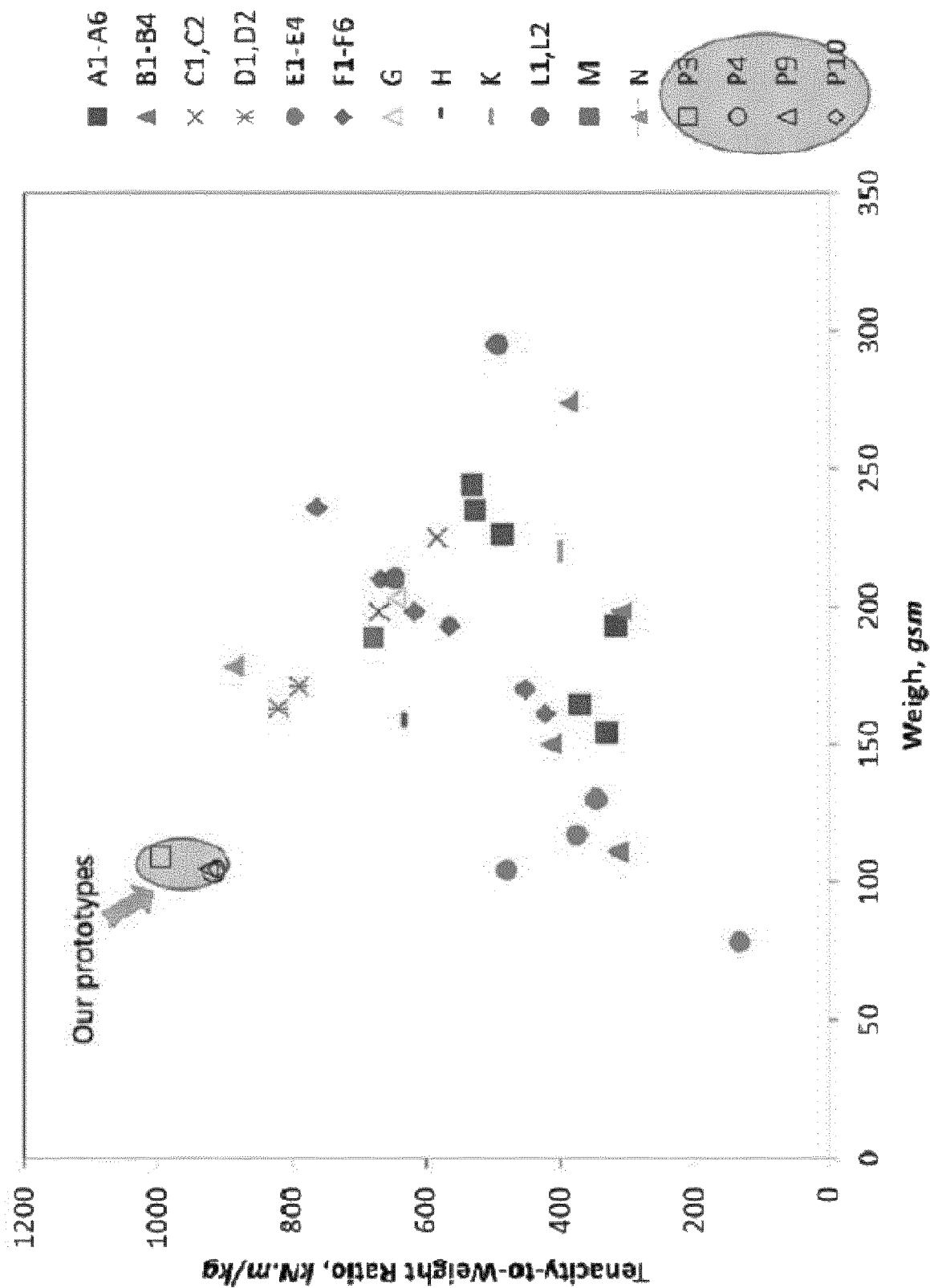
Figure 10:
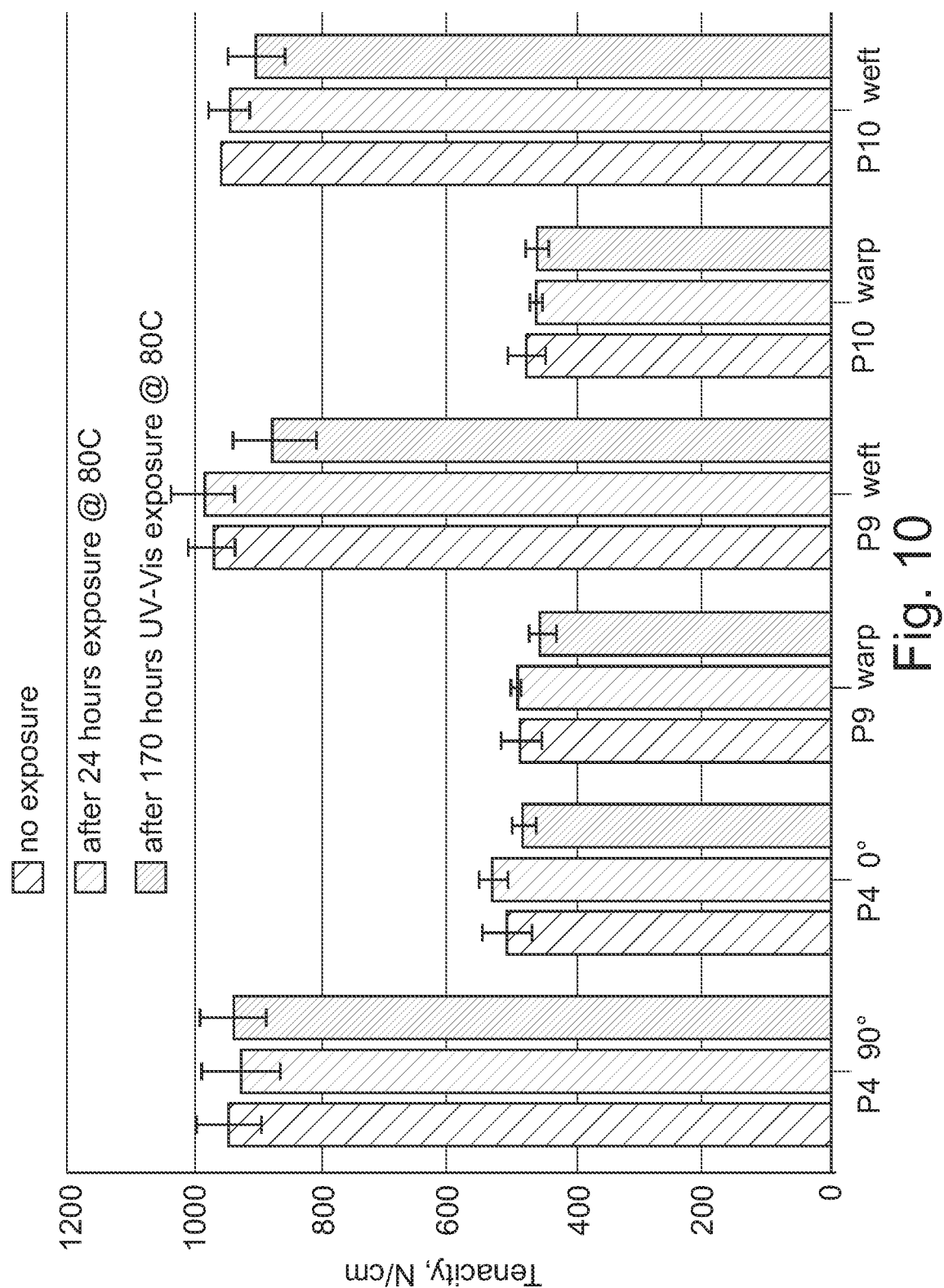
Figure 11:
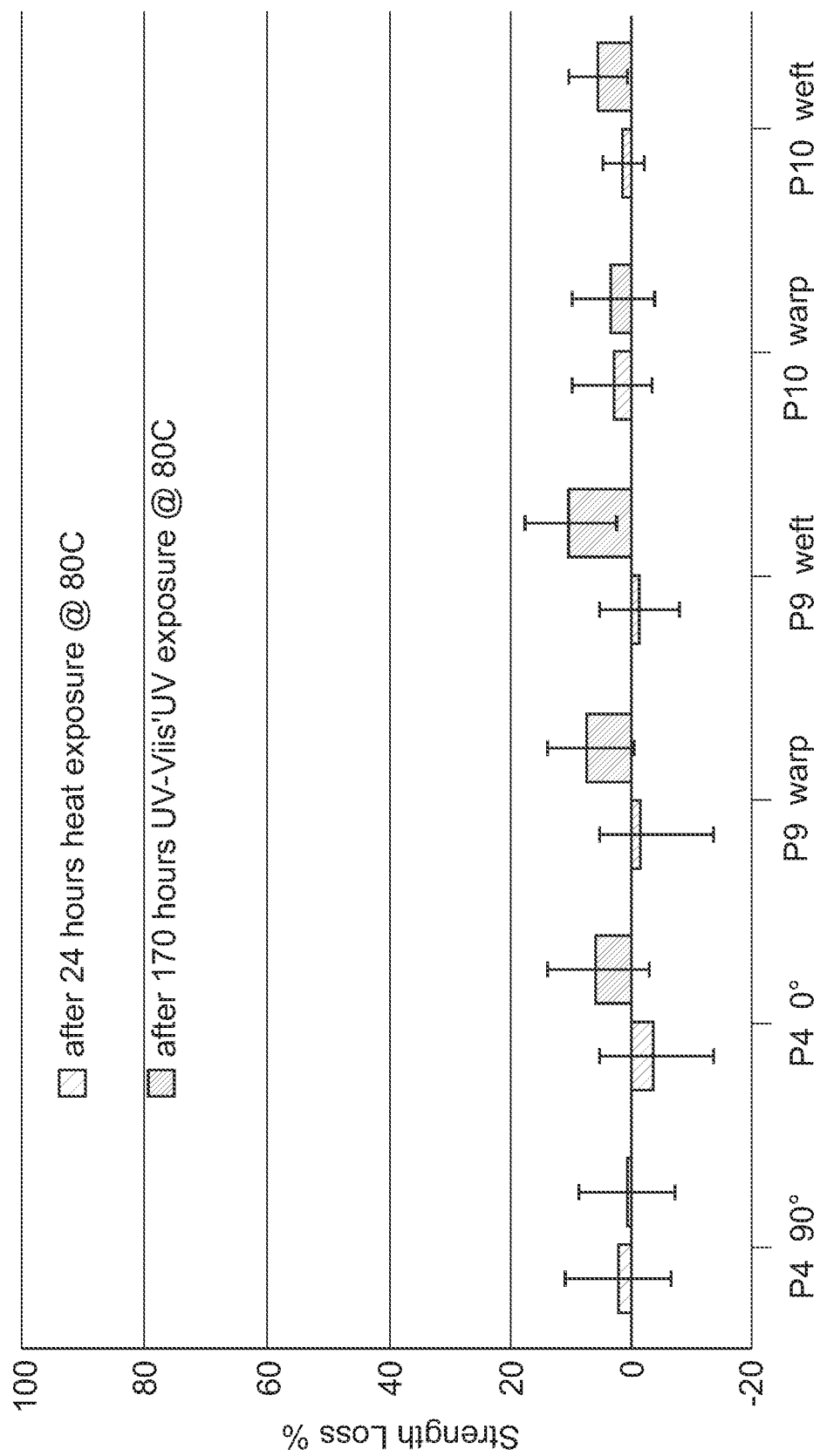
Figure 12:
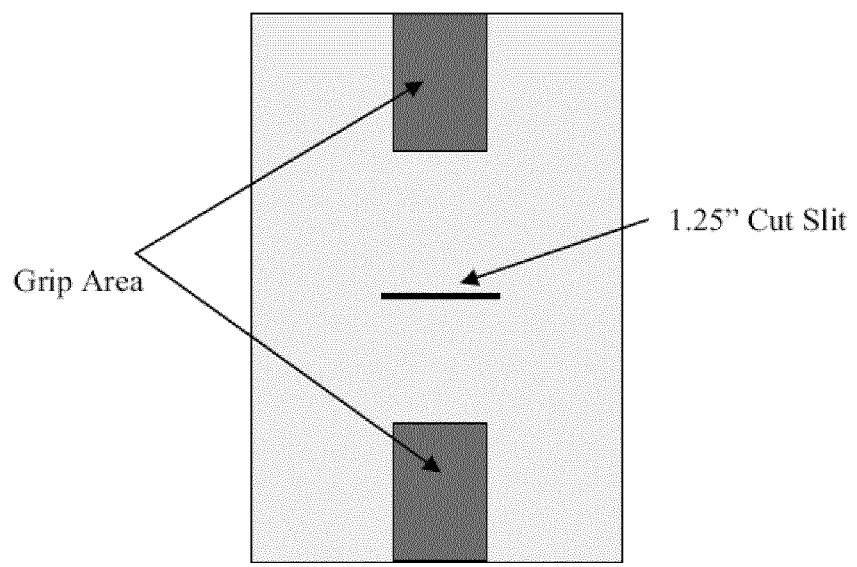
Figure 13:
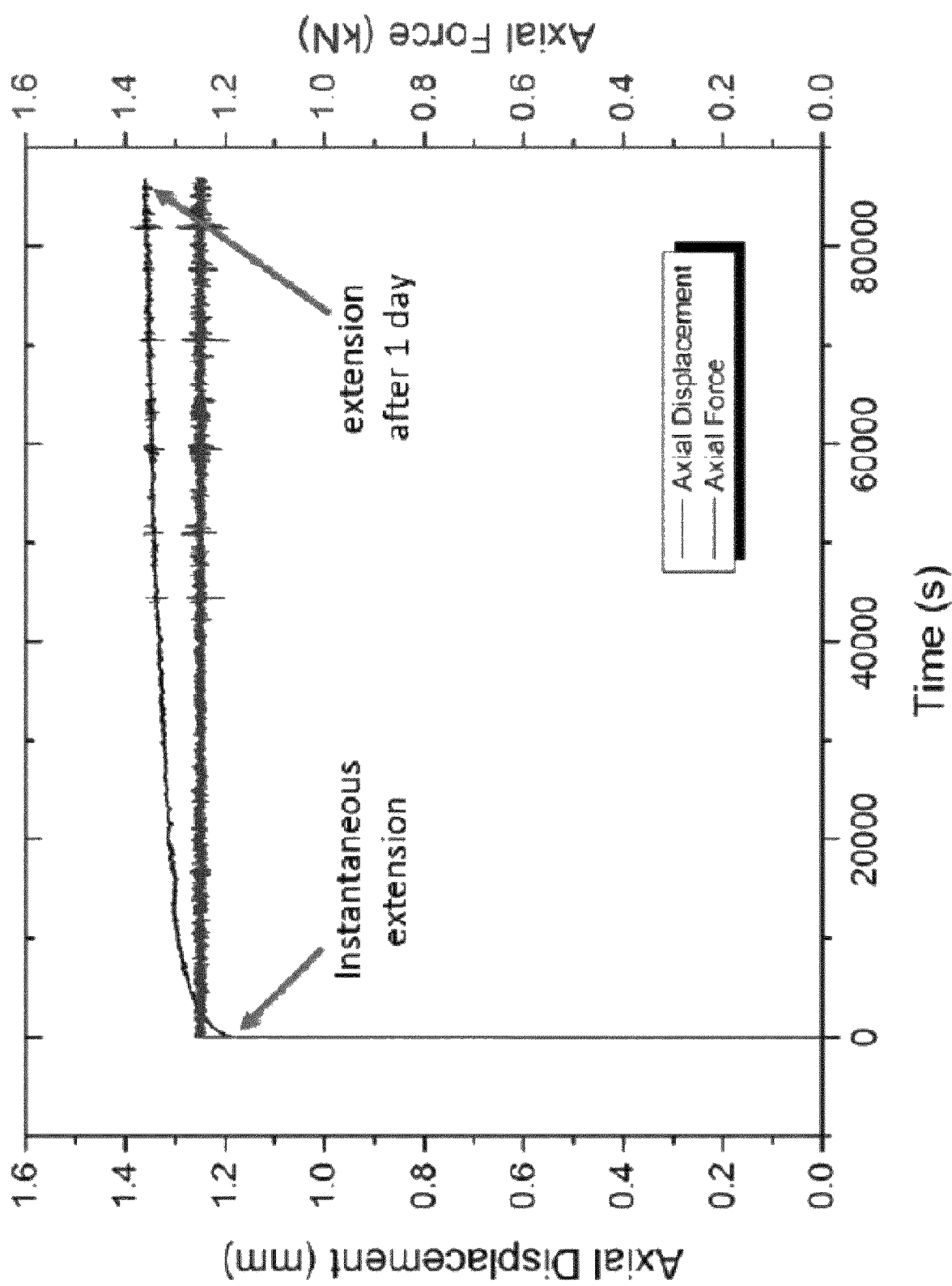
Figure 14:
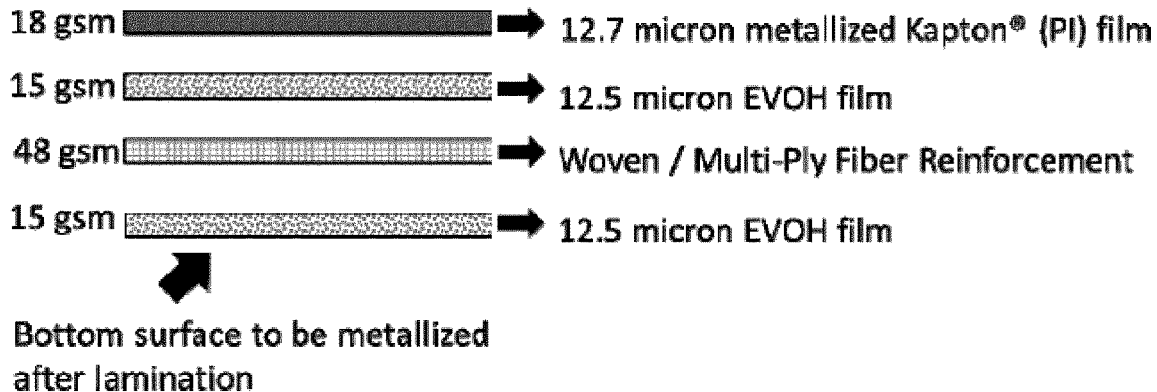
Figure 15:
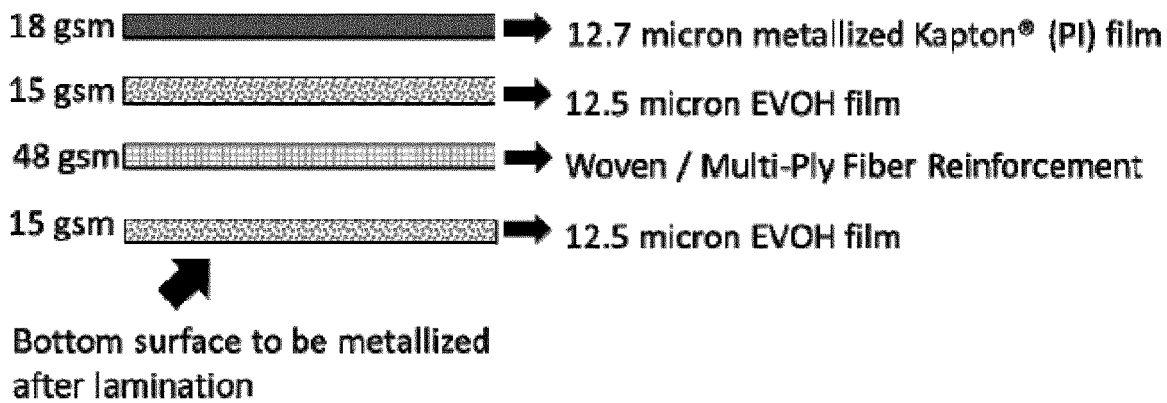
Figure 16:
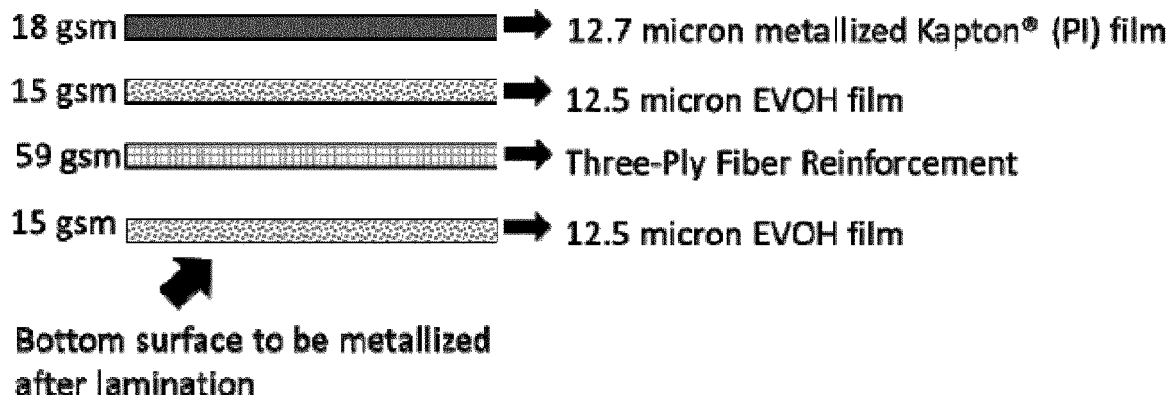

The invention will be explained in more detail with reference to the drawing, where FIG. 1 illustrates a principle sketch for the laminate of the hull material;

FIG. 2 illustrates an alternative principle sketch for the laminate of the hull material;

FIGS. 3a, 3b and 3c illustrate a fibre re-enforcement (FR) layer a) non-crimp 2 ply cross-ply and b) woven; c) non-crimp 3 ply;

FIGS. 4a and 4b Prototype P3, a) schematic design and b) photographs of outside and inside;

FIGS. 5a and 5b Prototype P4, a) schematic design and b) photographs of outside and inside;

FIGS. 6a and 6b Prototype P9, a) schematic design and b) photographs of outside and inside;

FIGS. 7a and 7b Prototype P10, a) schematic design and b) photographs of outside and inside;

FIG. 8 Comparison of the strength and weight of the new laminate prototypes and laminate materials developed in other studies;

FIG. 9 Comparison of the strength-to-weight ratio of the new laminate prototypes and laminate materials developed in other studies;

FIG. 10 Comparison of tensile strength of prototypes before and after thermal exposure and accelerated UV-Vis weathering;

FIG. 11 Strength loss after thermal exposure and accelerated UV-Vis weathering;

FIG. 12 Schematic diagram of a cut-slit tear specimen;

FIG. 13 Load extension curve of prototype P4 subjected to a constant load of 1250 N;

FIG. 14 Prototype P12, schematic design;

FIG. 15 Prototype P13, schematic design;

FIG. 16 Prototype P14, schematic design;

FIGS. 17a, 17b, 17c and 17d illustrate DMA measurements performed for a) EVOH film, b) Mylar film, c) PI film, d) the warp of prototype P4.

DETAILED DESCRIPTION/PREFERRED EMBODIMENT

In order to provide a thin and light-weight hull material laminate, which at the same time is gas tight, UV resistant, heat-resistant, and chemically resistant, especially against singlet oxygen and ozone, the following basic scheme was used, which is exemplified in FIG. 1. A load-bearing fibrous re-enforcing (FR) layer is sandwiched between two adhesive layers, which are used to bond the FR to further layers, for example, an outer hull layer, in the following called weathering layer, and a potential inner hull layer as a gas barrier. In particular, the adhesive layers are configures as efficient gas barrier with low gas permeability. For example, the adhesive layers are main gas barrier layers such that the total gas permeability of the adhesive layers is less than the gas permeability of the remaining layers. This combination of functions of adhesivity and low gas permeability is unconventional. In contrast thereto, in the prior art, there are specific main gas-barrier layers different from the adhesive layers, where the main gas barriers have a lower gas permeability than the adhesive layers. In this context gas permeability concerns the gas inside the hull, typically Helium or Hydrogen gas.

As an example, illustrated in more detail in FIG. 1, a fibrous load bearing layer is sandwiched between two EVOH layers, which not only work as gas barriers but are also used to take the role of adhesive for potential further layers, especially an outer hull layer, in the following called weathering layer, and a potential inner hull layer as a further gas barrier. Further functions of the layers, especially the weathering layer are protection against UV radiation, visible light, ozone, singlet oxygen, and heat.

Although, two EVOH film layers have been used in the optimization process, it is believed that a single EVOH layer melt-bonded into the fibre layer also would be more advantageous than the laminate systems of the prior art.

A variation of the design concept of FIG. 1 is shown in FIG. 2. In this case, the laminate material does not have any separate inner primary gas barrier layer. Instead the inner surface of the laminate is metallized after the laminate formation. Use of EVOH as an adhesive material with low gas permeability and the metallization of the inner surface yields excellent gas barrier properties of the laminate material. Elimination of the gas barrier layer reduces the overall laminate weight, while the tensile strength of the laminate is not affected.

In the following, materials as well as production methods are discussed in relation to experiments that were performed in optimising the hull laminate material.

Yarn Selection

In order to simultaneously optimize low weight and high strength, high strength fibres are advantageously used. An example of an advantageous material for the fibrous load-bearing layer was found in crystalline PBO (crystalline polyoxazole, poly(p-phenylene-2,6-benzobisoxazole) fibres, especially of the brand Zylon® because these fibres have a very high strength and specific modulus among the commercially available high performance fibres. These yarns also have high resistance to creep elongation. Zylon® yarns were therefore selected for the fibre reinforcement in the laminate material used in experiments. However, PBO is known to be very susceptible to photo-degradation. The presence of moisture and oxygen has been accelerates photo-degradation, why a protection mechanism had to be found.

For the fibre reinforcement layer, both balanced and unbalanced structures can be used. In some embodiments, an unbalanced construction was chosen to provide the different strength required in the longitudinal and the hoop direction of the LTA airship.

Zylon® yarns with 99 denier, 150 denier, and 250 denier yarn counts were provided by Toyobo Co., Ltd. The supplied yarns, which had zero-twist (non-twisted), were tested for their tensile strength. The average tensile strengths of non-twisted 99 denier and 250 denier yarns were 35.5 gf/denier (4.8% cv; cv=coefficient of variation) and 34.9 gf/denier (3.0% cv), respectively. Recognizing the fact that adding an optimum degree of twist (twist factor) to a yarn provides its highest tensile strength, a series of tests were conducted to determine the optimum twist factor and the corresponding highest tensile strength achievable in 99 denier and 250 denier Zylon® yarns. The Twist Factor (TF), which depends on both the amount of twist (twists per inch, tpi; twists per meter, tpm; 1 tpi=39 tpm), and the yarn count are calculated using the formula $TF=0.124 \cdot tpi \cdot dtex^{0.5}$ where dtex is the unit for count, also called yarn linear density (1 denier is equal to 0.9 dtex).

The yarns with 99 denier (110 dtex) and 250 denier (278 dtex) were twisted with various amount of twist (tpi, tpm) and tested for their tensile strength. The results tabulated in Table 1 show that the tensile strength of both 99 denier and 250 denier yarns are highest for the Twist Factor of 10 which corresponds to 7.69 tpi (or 303 twists per meter, tpm) for the 99 denier yarn and 4.84 tpi (or 190 tpm) for the 250 denier yarn.

TABLE 1

| Twist Factor | Yarn count, denier | turns per inch, tpi | Tenacity, gf/denier avg. | cv % | Strain @ peak load, % avg. | cv % |
|---|---|---|---|---|---|---|
| 10.00 | 99 | 7.69 | 40.6 | 3.3 | 3.9 | 9.6 |
| 13.21 | 99 | 10.16 | 39.9 | 3.1 | 3.8 | 2.1 |
| 9.19 | 250 | 4.45 | 37.5 | 2.7 | 3.6 | ~0 |
| 10.00 | 250 | 4.84 | 39.0 | 1.5 | 3.7 | 3.0 |
| 11.55 | 250 | 5.59 | 38.0 | 3.5 | 3.7 | 3.7 |
| 13.13 | 250 | 6.35 | 38.9 | 1.4 | 3.8 | ~0 |

Fibre Reinforcement Configuration

In experiments, for the load bearing layer, several principles were applied. One was a non-crimp 2 ply cross-ply fibre reinforcement layer as illustrated in FIG. 3a and another a woven fibre reinforcement layer as illustrated in FIG. 3b. A third principle with 901±45 degree plies is illustrated in FIG. 3c.

Film Selection for Lamination

EVOH (Ethylene Vinyl alcohol copolymer) has a very low permeability with respect to gas, especially He, which is why it is a good candidate for the adhesive layer.

A good candidate for the outer weathering layer against the outer atmosphere was found in PI (polyimide), although also other polymers are possible, for example polyvinyl fluoride (PVF). Advantageously, the outer weathering layer was metallised, in order to repel radiation and heat. In order to protect the metal against damages, the metal coating was directed inwards, which is between the polymer of the weathering layer and the EVOH. This way, the polymer protects the metal against the corrosive environment in the stratosphere.

Alternatively, the weathering layer is metallized on both sides. If the weathering layer is metallized on both sides or has a metalized side that is exposed to the environment, it is advantageously protected by a corrosion resistance coating.

In some embodiments, an inner gas barrier was added to the opposite side of the multilayer as compared to the weathering layer, where the inner gas barrier layer was a metallised polyethylene terephthalate (PET) film, for example Mylar®.

Lamination was done for laminates with a size of 7.5 inch×7.5 inch (19 cm×19 cm) under pressure at 285 psi=1965 kPa between two stationary aluminium plates with a temperature of 175-178° C. for 15 minutes, the upper end of the temperature interval showing the best lamination results. These samples for used for tests of various kinds as described in the following.

However, different combinations of temperature and dwell time are possible. In other experiments, a lower pressure and lower dwell time at higher temperature in the range of 180-200° C. was successful. For example, a temperature of 196° C. was used for 2 seconds at a pressure of 60 psi=414 kPa.

Strength Measurements

Tensile strength measurements were performed according to the Standard Test Method for Breaking Force and Elongation of Textile Fabrics (Strip Method) ASTM D5035. The tensile strength values are reported in the units of N/cm and gf/denier (mN/tex=88.3 gf/den). Tensile strength in N/cm represents the sample tenacity per unit width in cm. Tensile strength in gf/denier represents the sample tenacity per total denier of yarns in the loading direction. Tensile strength in gf/denier is used as a normalized metric to determine how of much of yarn strength is translated to laminated/non-laminated fibre reinforcement strength.

For unbalanced structures, as explained in the following in detail, estimated tensile strengths (calculated based on the yarn strength and fibre reinforcement construction parameters) were 1033 N/cm and 516 N/cm in the warp and weft directions, respectively. In general, the warp direction tensile strength of all the samples (except laminated woven fibre reinforcements) were found to be close to 1000 N/cm, while the weft of all samples were found to be greater than 500 N/cm. Corresponding parameter values in terms of gf/den were in the range of 31-35.

Experiments were also performed for balanced fabric structures based on Zylon® yarn in the fabric. Low twisted (3-5 tpi) Zylon® yarns of 99 denier and with a density of 46-50 ypi (approximately 18-20 yarn per cm) were used for both the warp and the weft in a plain weave. The Zylon® yarn was sized with polyvinyl alcohol. Tensile strengths were measures in the range of 520 to 615 N/cm and 28 to 34 gf/den in the warp and weft directions, and an elongation at break of 2.9-3.2%. These results are also very good for the purpose, seeing that this were values for the fabric and not the entire laminate. In more detail the following data were measured.

As a conclusion, it has been demonstrated that both balanced and unbalanced structures with high-strength yarns are very useful.

EXAMPLE 1—P3

FIG. 4a shows a specific embodiment of the principle sketch of FIG. 2. On the left in the figure, the weight of each layer is shown in unit of grams per square meter (gsm), and the thickness in microns is shown to the right. Photographs of the produced laminates are shown in FIG. 4b.

The schematic design of this laminate prototype, in the experiment termed P3, comprises an unbalanced cross-ply (two-ply) non crimp fabric as the fibre reinforcement. The fabric has 250 denier Zylon® yarns in 90-degree and 0-degree directions. The basis weight of the fabric is 48 gsm with yarn density of 30 ypi (30 yarns per inch are approximately 12 yarns per cm) in 90-degree direction and 15 ypi (approximately 6 yarns per cm) in 0-degree direction, thus, yielding more strength in the 90-degree direction than in the 0-degree direction. The prototype design includes three layers of EVOH film which provide excellent adhesion and gas barrier properties. The estimated and measured weight of this laminate prototype was found to be 111 gsm and 109 gsm, respectively.

EXAMPLE 2—P4

FIG. 5a shows a specific embodiment of the principle sketch of FIG. 1. On the left in the figure, the weight of each layer is shown in unit of grams per square meter (gsm), and the thickness is shown to the right. Photographs of the produced laminates are shown in FIG. 5b.

The schematic design of this laminate prototype, in the experiment termed P4, comprises an unbalanced cross-ply (two-ply) non crimp fabric as the fibre reinforcement. The fabric has 250 denier PBO yarns in longitudinal and cross directions. The basis weight of the fabric is 48 gsm with yarn density of 30 ypi (approximately 12 yarns per cm) in 90-degree direction and 15 ypi (approximately 6 yarns per cm) in 0-degree direction. In order to achieve lower laminate weight, the design uses two layers of EVOH film and a bottom layer of a lightweight metallized PET film (Mylar®) which serves as the primary gas barrier layer. The estimated and measured weight of this laminate prototype is 103 gsm.

EXAMPLE 3—P9

FIG. 6a shows a specific embodiment of the principle sketch of FIG. 1. On the left in the figure, the weight of each layer is shown in unit of grams per square meter (gsm), and the thickness is shown to the right. Photographs of the produced laminates are shown in FIG. 6b.

The schematic design of this laminate prototype, in the experiment termed P9, comprises an unbalanced woven fabric as the fibre reinforcement. The woven fabric has 99 denier Zylon® yarns with 40 tpm twist in warp direction and non-twisted 250 denier Zylon® yarns in weft directions, respectively. The basis weight of the fabric is 50 gsm with yarn density of 40 ypi (approximately16 yarns per cm) in warp direction and 30 ypi (approximately 12 yarns per cm) in weft direction. Like prototype P4, the bottom layer is a lightweight metallized PET film (Mylar®) which serves as the primary gas barrier layer. Although the lamination temperature of 175° C. produced satisfactory adhesion between the layers, increasing the lamination temperature to 178° C. improved the adhesion between layers. The estimated and measured weights of this laminate prototype were found to be 105 gsm.

EXAMPLE 4—P10

FIG. 7a shows a specific embodiment of the principle sketch of FIG. 1. On the left in the figure, the weight of each layer is shown in unit of grams per square meter (gsm), and the thickness is shown to the right. Photographs of the produced laminates are shown in FIG. 7b.

The schematic design of this laminate prototype, in the experiment termed P10, comprises an unbalanced woven fabric as the fibre reinforcement. Unlike the prototype P9, prototype P10 uses woven fabric with 99 denier Zylon® yarns with 40 tpm twist in warp direction and non-twisted 99 denier Zylon® yarns in weft directions, respectively. The basis weight of the fabric is 50 gsm with yarn density of 40 ypi (approximately 16 yarns per cm) in warp direction and 75 ypi (30 yarns per cm) in weft direction. The higher ypi (yarns per inch) in the weft direction is expected to form a more stable fabric structure with smoother surface texture. In the initial trails, a lamination temperature of 175° C. was used, however, this resulted in poor lamination quality with weak adhesion of the metallized PI film. Increasing the lamination temperature to 178 C improved the lamination quality, but the adhesion was not as good as prototype P9 but still satisfactory. The estimated and measured weight of this laminate prototype was found to 105 gsm.

Gas Barrier Performance

Helium permeability test results (Table 2) shows that while both the laminate prototypes P3 and P4 have much lower helium permeability than the target value of 132 cc/m2.day·atm, laminate prototype P4 has significantly lower helium permeability compared to that of prototype P3. The lower permeability of prototype P4 is attributed to the presence of the metallized Mylar® layer which also reduced the overall weight of the prototype P4.

TABLE 2

| Laminate Prototype | Laminate Weight, gsm | Gas(He) Permeability, $cc/m^2 \cdot day \cdot atm$ |
|---|---|---|
| P3 | 109 | 23 |
| P4 | 103 | 8 |

Given the same layering schemes, helium permeability values of prototypes P9 and P10 were expected to be same as that of prototype P4, which with respect to gas tightness were favoured over P3.

Laminate Strength

The warp and weft direction tensile strength of laminate prototypes P4, P9, and P10 are shown in Table 3. The tensile strength of one specimen of prototype P3 was found to be 1086 N/cm.

TABLE 3

| Laminate Prototype | Laminate Weight, gsm | Tensile Strength, N/cm | | | | Tensile Strength, gf/denier | | | | Elongation % @ break | | | |
|---|---|---|---|---|---|---|---|---|---|---|---|---|---|
| | | Warp | | Weft | | Warp | | Weft | | Warp | | Weft | |
| | | Avg. | cv % | Avg. | cv % | Avg. | cv % | Avg. | cv % | Avg. | cv % | Avg. | cv % |
| P4 | 103 | 945.4 | 5.5 | 507.8 | 7.9 | 32.1 | 5.7 | 35.3 | 5.0 | 3.17 | 7.3 | 2.91 | 5.0 |
| P9 | 105 | 486.9 | 6.0 | 970.8 | 3.7 | 32.0 | 5.5 | 32.9 | 4.5 | 3.01 | 7.8 | 3.29 | 8.8 |
| P10 | 105 | 476.8 | — | 956.4 | — | 30.7 | — | 33.3 | — | 2.68 | — | 3.41 | — |

The estimated tensile strengths, calculated based on the yarn strength and fibre reinforcement construction parameters, are 1033 N/cm and 516 N/cm in the two directions. The measured tensile strength of the prototypes was slightly lower than the estimated values. The lower tensile strengths compared to the estimated tensile strength is attributed to manual experimental preparation of laminate prototypes which causes lack of complete alignment of yarns and non-uniform tension in the yarns. These imperfections result in non-uniform load sharing among the load-bearing yarns which ultimately causes pre-mature rupture of specimens during the tensile test. It is believed that the tensile strengths improve and are similar to theoretical values when the laminates are produced in a dedicated large scale production facility. However, it is pointed out that the experimental values are deviating by less than 10% from the heoretical values, which is a very satisfactory result.

Comparison with Other Studies

A comparison of the strength and weight of the new laminate prototypes and laminate materials developed in other studies in the literature is shown in FIG. 8. The references are found at the end of this section in relation to Table 4.

Comparison of strength-to-weight ratio of the new laminate with the laminates developed by other studies is shown in FIG. 9. The new laminate prototypes are not only significantly lighter than any other laminates with similar tensile strength, but also significantly stronger than any laminate with the similar weight. The strength-to-weight ratios of the new laminate prototypes are higher than all the laminates developed in other studies.

As it is seen in this comparison, the strength of the laminates P3, P4, P9, and P10 is very high as compared to the weight, making them highly suitable for use in lighter than air vehicles. However, it is pointed out that the superior Tenacity-to-weight ratio, as illustrated in FIG. 9, is believed to be scalable to thicker laminates, which favours the exemplified laminates also over those laminates that have an overall higher tenacity in FIG. 8.

TABLE 4

| # | Organization/ Study | Remarks | Material Description | Tenacity, N/cm | Weight, gsm | Tenacity-to-Weight Ratio, kN · m/kg |
|---|---|---|---|---|---|---|
| A1 | Development of | *Z500-100* means | Z500-000PU-XL | 1300 | 244 | 533 |
| A2 | High Specific | 500d | Z250-94PU-XL | 1240 | 235 | 528 |
| A3 | Strength | Zylon fiber is used & | Z250-79PU-XL | 1100 | 226 | 487 |
| A4 | Envelope | 100 gsm | Z250-47PU-XL | 615 | 193 | 319 |
| A5 | Material[1] | | Z250-47PU | 610 | 164 | 372 |
| A6 | | | Z250-40PU | 510 | 154 | 331 |
| B1 | Development of | B3, B5 are developed, | V-PU-XL | 610 | 198 | 308 |
| B2 | High Specific | B1, B2, B4 are off | V100-31PE-XLA | 620 | 150 | 413 |
| B3 | Strength | the shelf; V:Vectran, | V-PU-XL | 350 | 111 | 315 |
| B4 | Envelope Material[1] | PU: Polyurethane, PE: Polyethylene, XL: EVOH, XLA: Aluminum stuck EVOH | V200-102PU-XL | 1060 | 274 | 387 |
| C1 | Development of | A1-A6 are modified into | TA-2250 110PU | 1327 | 198 | 670 |
| C2 | High Specific Strength Envelope Material[1] | this category; TA: Tedlar with Aluminum-deposit, T: Tesliar, Z: Zylon, PUA: | T-Z250-110PU | 1313 | 225 | 684 |
| D1 | Development of | Polyurethane with | Z250-110PUA-XLD | 1337 | 163 | 820 |
| D2 | High Specific Strength Envelope Material[1] | Aluminum deposit | Z250110PU-XLD | 1350 | 171 | 789 |
| E1 | Development of | for internal gas bag or | N30-40PU-XLD | 105 | 78 | 135 |
| E2 | High Specific | light weight use; | K200-H-MI | 450 | 130 | 346 |
| E3 | Strength | N: Nylon, K: Kevlar, | V-H-MI | 500 | 104 | 481 |
| E4 | Envelope Material[1] | H: Hydrel, MI: Mictron | Z-H-MI | 440 | 117 | 376 |
| F1 | Development of | Thick Zylon fibers are | Z500-37M | 680 | 161 | 422 |
| F2 | High Specific | sandwiched by two | Z1000-74M | 1220 | 198 | 616 |
| F3 | Strength | Mylar films | Z1500-111M | 1800 | 236 | 763 |
| F4 | Envelope | | Z1000-44M | 770 | 170 | 453 |
| F5 | Material[1] | | Z1500-67M | 1090 | 193 | 565 |

TABLE 4-continued

| # | Organization/ Study | Remarks | Material Description | Tenacity, N/cm | Weight, gsm | Tenacity-to-Weight Ratio, kN · m/kg |
|---|---|---|---|---|---|---|
| F6 |  |  | Z2000-89M | 1400 | 210 | 667 |
| G1 | Japan Aerospace Exploration Agency (JAXA)[2,3,4] | Suitable for Operational Airship (overall length: 250 m) | AL-PVF + PU + Zylon fabric + PU | 1310 | 203 | 645 |
| H1 | Japan Aerospace Exploration Agency (JAXA)[4,5,6] | "Technology Demonstrator" Airship (overall length: 150 m) | AL-PVF + PU + Zylon fabric + PU | 993 | 157 | 632 |
| J1 | Cubic Tech Corp[7] | Heavy Zylon Noncrimp Fabric | Zylon FR (349 gsm) | 2833 | — | — |
| J2 | Cubic Tech Corp[7] | Medium Vectran Noncrimp Fabric | Vectran FR (139 gsm) | 916 | — | — |
| K1 | Kang et al 2006[8] | Vectran woven Fabric | Vectran FR (109) + PU coating + PVF + PU film | 883 | 220 | 401 |
| L1 | Gu 2007[9] | Lindstrand HALE Airship Envelope | Vectran FR | 1460 | 295 | 495 |
| L2 | Gu 2007[9] | Envelope of Stratespheric Airship (overall length 200 m) | na | 1360 | 210 | 648 |
| M1 | Cao & Gao 2009[10] | Zylon plain weave (Weft) | PBO FR (87) + PVF (52) + PU (25*2) + PU coating (5-8) | 1013 1281 | 189 | 536 678 |
| N1 | Li et al. 2010[11] | Zylon plain weave (Warp) Zylon plain weave (Weft) | 990 denier PBO (78) + PET (40) + PVF (30) + PU (30) | 1578 1356 | 178 | 887 762 |

REFERENCES TO TABLE 4

1. Kamatsu, K, Sano, M., and Kakuta, Y., "Development of High Specific Strength Envelope Material", AAIA 3rd Annual Aviation Technology, Integration, and Operations (ATIO) Tech, Nov. 17-18 2003, Denver, Colo.

2. Sasaki Y., Eguchi, K, Kono T, and Maekawa, S, "Scenario for Development of the SPF Airship Technology Demostrator", The Fifth Stratospheric Platform Systems Workshop, Feb. 23-24, 2005, Tokyo, Japan.

3. Maekawa S, "On the Design Issue of a Stratospheric Platform Airship Structure" NAL TM-722, National Aerospace Laboratory of Japan, May 2003.

4. Maekawa, S and Yoshino, T, "Tear propagation of a High-Performance Airship Envelope Material", Journal of Aircraft, 45 (5), September-October 2008.

5. Nkadate, M., Maekawa, S., Maeda .T, Hiyoshi, M., Kitada, T., and Segawa6, S. "Reinforcement of an Opening for High Strength and Light Weight Envelop Material Zylon" 18th AIAA Lighter-Than-Air Systems Technology Conference, May 4-7 2009, Seattle, Wash., USA.

6. Nakadate, M., Maekawa, S., Shibasaki, K, Kurose, T. Kitada, T, and Segawa, S., "Development of High Strength and Light Weight Envelop Material Zylon" 7th International Airship Convention 2008, Friedrichshafen Germany, Oct. 9-11 2008.

7. High Strength-to-Weight Ratio Non-Woven Technical Fabrics for Aerospace Applications" Cubic Tech Corp, 2009, Mesa, Ariz.

8. Kang, W, Suh, Y, and Woo, K., "Mechanical property characterization of film-fabric laminate for stratospheric airship envelope" Composite Structures, 75, pp.151-155, 2006.

9. Gu Z., "Research of Stratospheric Airships Skin Material" Spacecraft Recovery& Remote Sensing, 28(1), pp.62-66, 2007.

10. Cao, X, and Gao, C. "Fabrication and Investigation of Envelope Materials for Stratospheric Aircraft with PBO Fabric as Load-carriers" High-tech Fibre & Application, 34(4), pp.0-5, 2009.

11. Li B, Xing L, Zhou Z, Jiang S, and Chen X., "Study on Mechanical Properties of High Performance Envelope Materials" Material Engineering, pp.1-5, 2010.

Effect of Thermal and UV-V is Weathering

Laminate prototypes P4, P9, and P10 were subjected to two different weathering conditions. In one weathering exposure the prototypes were subjected to thermal exposure for 24 hours in an oven at 80° C. The other weathering exposure involved the accelerated exposure to UV and Visible light (UV-Vis) spectrum of ~275 to 700 nm for a duration of 170 hours (~60 days of real time exposure at an altitude of 10 km). The prototypes were exposed in an Atlas Ci 3000+ Weather-Ometer (www.atlas-mts.com) with the irradiance level of 1.1 Watts/m2 at 340 nm. During the UV-Vis weathering, the temperature of the prototypes was maintained at about 80° C. For UV-Vis weathering the specimens were mounted on metal frames and the inner side (Mylar® side) of the samples was covered with two layers of black card paper to prevent any exposure to the inner side. The frames were then mounted on round rails inside the weathering chamber of Atlas Ci 3000+ Weather-Ometer such that the outside of the specimens were facing towards the UV and visible light source.

The tensile strength of the prototypes after each weathering exposure was tested. The strength loss in percentage was as defined as follows:

$$\text{Strength Loss \%} = \frac{\text{Tensile Strenth}_{before\ exposure} - \text{Tensile Strength}_{after\ exposure}}{\text{Tensile Strength}_{before\ exposure}} \times 100$$

This was used as a metric to evaluate thermal and photo-degradation.

The average tensile strength before and after thermal exposure and UV-Vis weathering were found to be statistically the same (statistical analysis was performed using t-test at 95% confidence level). It can therefore be concluded that there is negligible degradation caused by thermal and UV-Vis weathering. It is important to notice that the specimens tested before and after weathering exposures were taken from different replicas of the same prototype. Due to the manual preparation of the prototypes, there are inherent variations within a replica as well as variations among the different replicas of the same prototype. Some of the samples exposed to heat showed higher strength compared to corresponding unexposed samples which strongly points to the variability in the specimens within a sample. A graphical comparison of tensile strengths of prototypes P4, P9, and P10 before and after thermal exposure and UV-Vis weathering is shown in FIG. 10.

Strength loss % in prototypes P4, P9 and P10 after thermal exposure and accelerated UV-Vis weathering is shown in FIG. 11.

The average tensile strength before and after thermal exposure and UV-Vis weathering were found to be statistically same (statistical analysis was performed suing t-test at 95% confidence level). It can therefore be concluded that there is negligible degradation caused by thermal and UV-Vis weathering. It is important to note that the specimens tested before and after weathering exposures were taken from different replicas of the same prototype. Due to the manual preparation of the prototypes, there are inherent variations within a replica as well as variations among the different replicas of the same prototype. Some of the samples exposed to heat showed higher strength compared to corresponding unexposed samples which strongly points to the variability in the specimens within a sample.

Tear Strength Measurements

The tear strength of prototype P4 and P9 were measured using the cut-slit tear test method MIL-C-21189. Schematic diagram of a tear specimen is shown in FIG. 12. A 1.25 inch cut slit is made at the centre of the specimen perpendicular to the direction of test. The specimens are 4 inch wide with a test gauge length of 3 inch between the grips.

Tear strength of a specimen was calculated by averaging the 5 highest peak loads during a tear test. Three specimens per sample were tested in warp and weft directions. The tear strength results of prototype P4 and P9 are shown in Table 5.

TABLE 5

| Laminate | Tear Strength, N | | | |
| | Warp | | Weft | |
| Prototype | Avg. | cv % | Avg. | cv % |
| --- | --- | --- | --- | --- |
| P4 | 330.7 | 9.5 | 403.5 | 9.7 |
| P9 | 290.0 | 6.6 | 533.7 | 5.2 |

The reason for the higher tear in warp direction of prototype P4 compared to prototype P9 is due to the difference in warp yarn denier used to construct the two structures. In prototype P4, 250 denier yarn was used, while in prototype P9, 99 denier was used. It is well established in the literature that the tear load increases by increasing the yarn braking load.

Resistance to Creep Elongation

A 1-inch wide specimen of prototype P4 was subject to a constant load of 1250 N for a duration of 1 day on a MTS Load frame (www.mts.com) with the load frame running in load control mode. The gauge length of the test specimen was 3 inch (76 mm). The load extension curve of the test is shown in FIG. 13. After an instantaneous extension of 1.6%, the P4 specimen showed a very small creep extension of 0.02%.

Alternative Laminates

FIG. 14 and FIG. 15 show specific light-weight embodiments of the principle sketch of FIG. 2.

The schematic design of the laminate prototype, experimentally termed P12, illustrated in FIG. 14 uses an unbalanced cross-ply non-crimp fabric or an unbalanced woven fabric as the fibre reinforcement. The 48 gsm fabric is made of PBO yarns. The inner surface of the laminate (adhesive layer) is metallized after the laminate formation. The estimated basis weight of the laminate prototype is 96 gsm.

Using a three-ply non-crimp fabric instead was expected to not only further reduce the fibre reinforcement weight but also increase the tensile strength of the laminate. An example of laminate prototype with three-ply fibre reinforcement is described below in relation to FIG. 15. The schematic design of this laminate prototype, experimentally termed P13, illustrated in FIG. 15, uses a three-ply fabric (250 denier yarn) with 15 ypi (approximately 6 yarns per cm) in 90° direction, and 11 ypi (approximately 4 yarns per cm) in +/−45° directions. The three ply is arranged as in FIG. 3c. The fibre reinforcement weight is equal to 41 gsm. Similar to prototype P12, the inner surface of the laminate (adhesive layer) is metallized after the lamination process. The estimated weight the laminate is expected to be 89 gsm. The estimated tensile strength of the laminate prototype P13 is estimated to be higher than 1000 N/cm.

The schematic design of laminate prototype, experimentally termed P14 illustrated in FIG. 16 uses a three-ply fabric (250 denier yarn) with 22 ypi (approximately 9 yarns per cm) in 90° direction, and 16 ypi (approximately 6 yarns per cm) in +/−45° directions. The fibre reinforcement weight is equal to 59 gsm. The three ply is arranged as in FIG. 3c. Similar to prototype P12, the inner surface of the laminate (adhesive layer) is metallized after the lamination process. The estimated weight the laminate is expected to be 107 gsm. The estimated tensile strength of the laminate prototype P13 is estimated to be higher than 1550 N/cm. The strength-to-weight ratio is estimated to be close to 1400 kN·m/Kg, which is vastly higher than all laminate materials developed in other studies.

Temperature Stability Measurements

Dynamic Mechanical Analysis (DMA) was made on a number of samples for a large temperature range in order to elucidate whether low temperatures could become a problem for the flexibility of the material. The temperature range was from −60° C. to 100° C. In this interval, the loss modulus, related to the inelastic properties and the energy dissipation, and the storage modulus, related to the elastic properties, were measured in units of MPa with a Q800 DMA measurement device commercially provided by TA Instruments, New Castle, DE19720, USA (www.TAInstruments.com). In addition, the ratio between the two parameters, also called Tan Delta, was calculated. Measurements are illustrated in FIGS. 17a, 17b and 17c.

The measurements are illustrated in

Figure 17A:
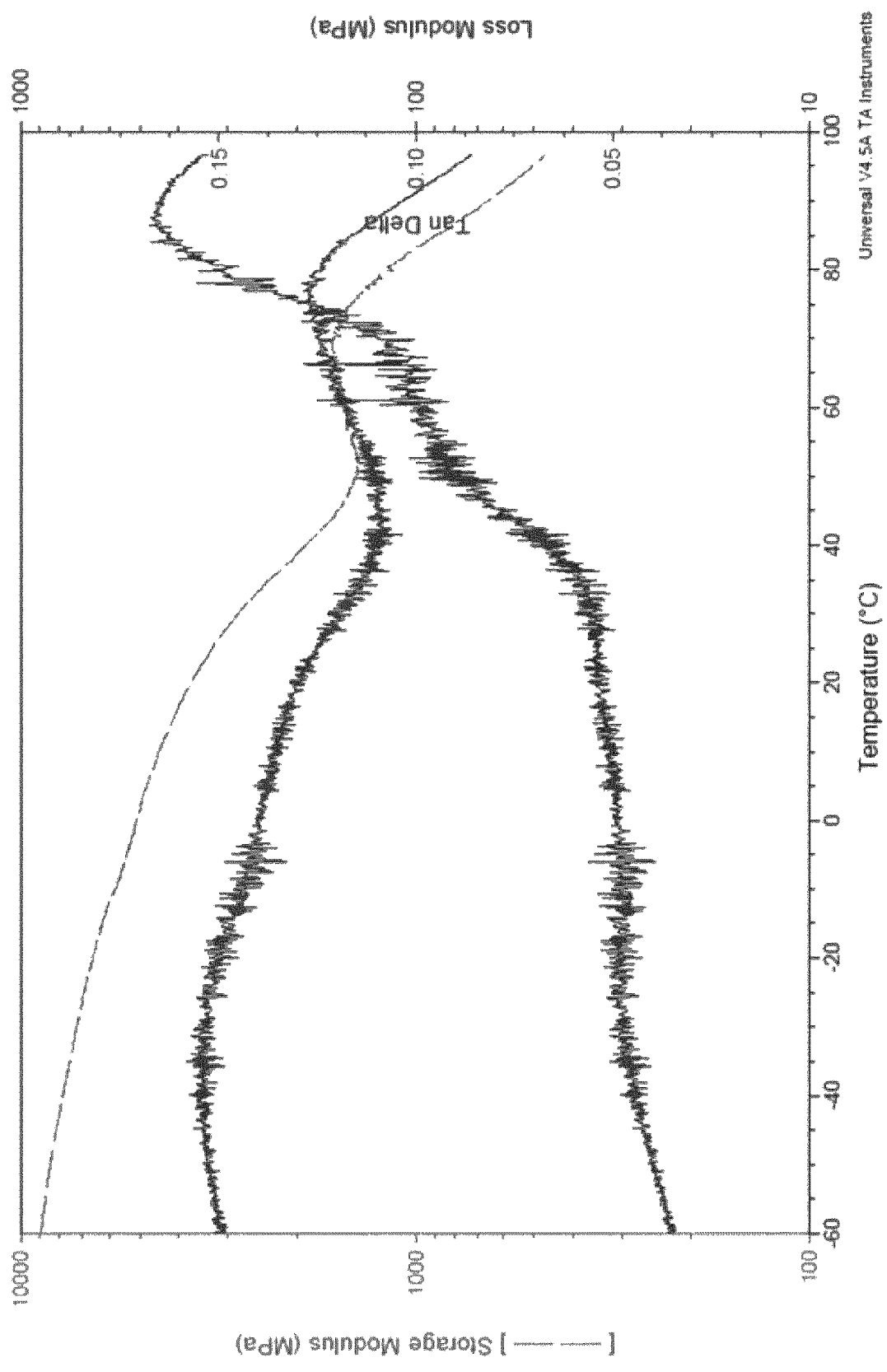
Figure 17B:
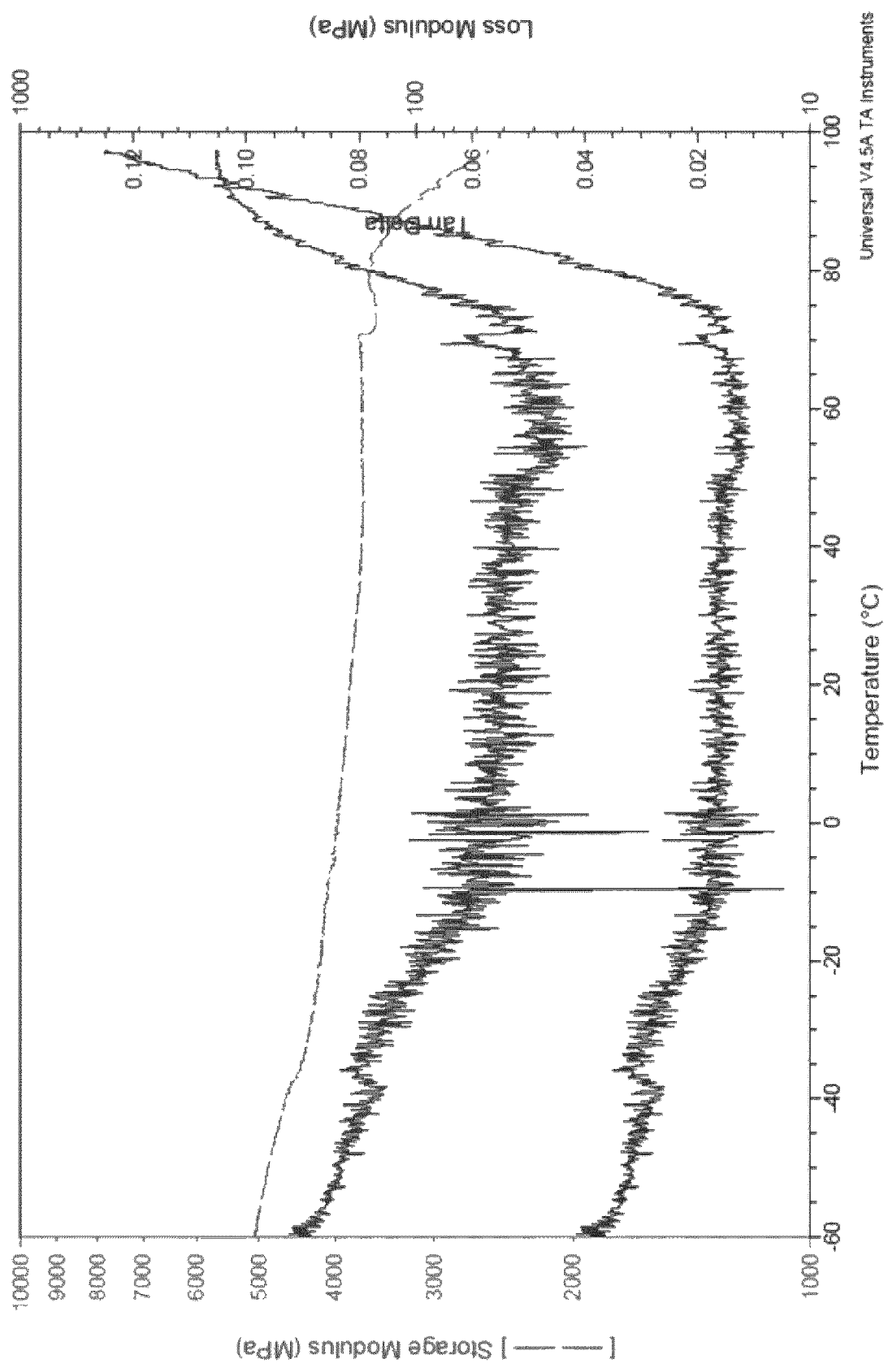
Figure 17C:
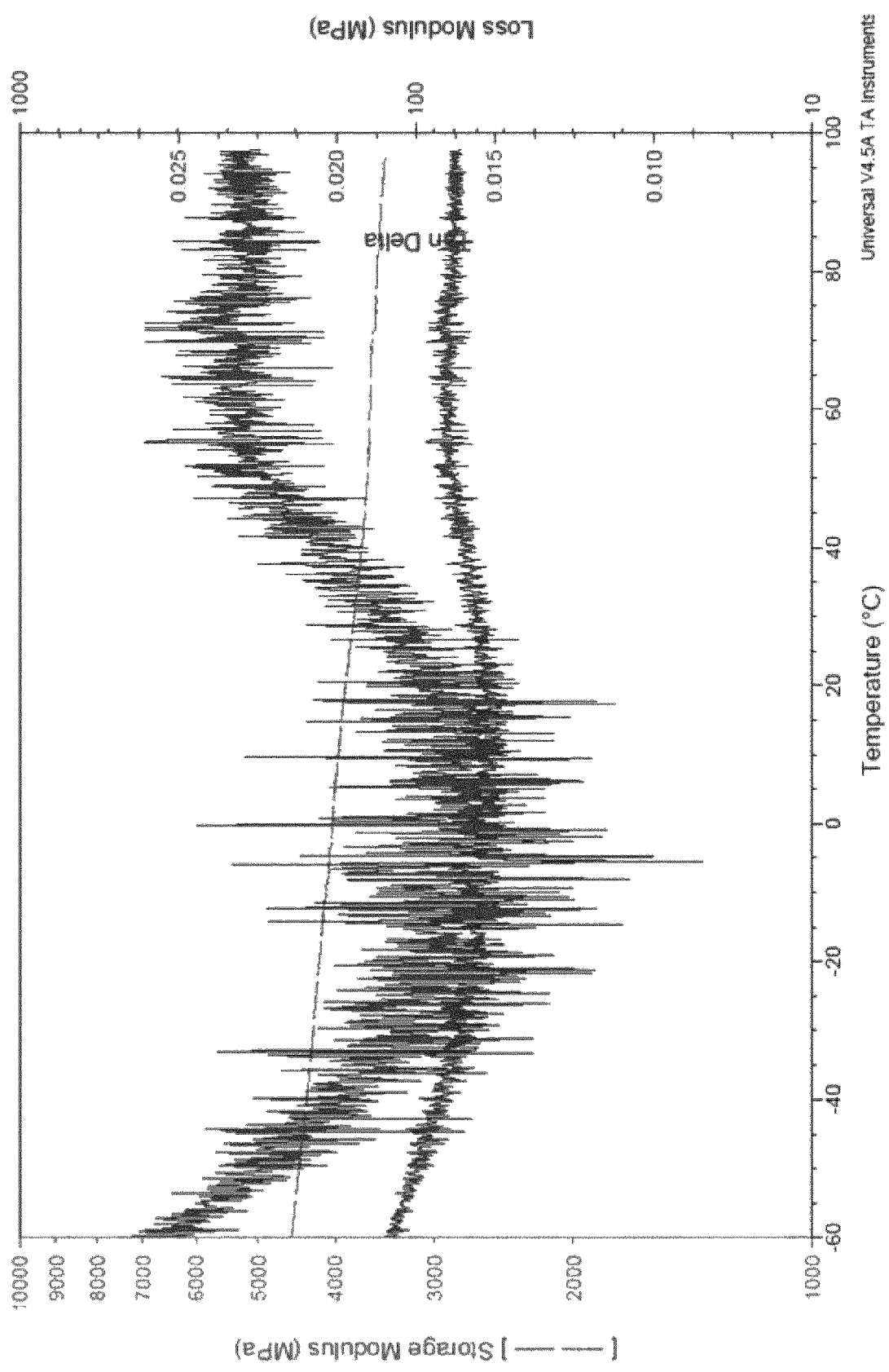
Figure 17D:
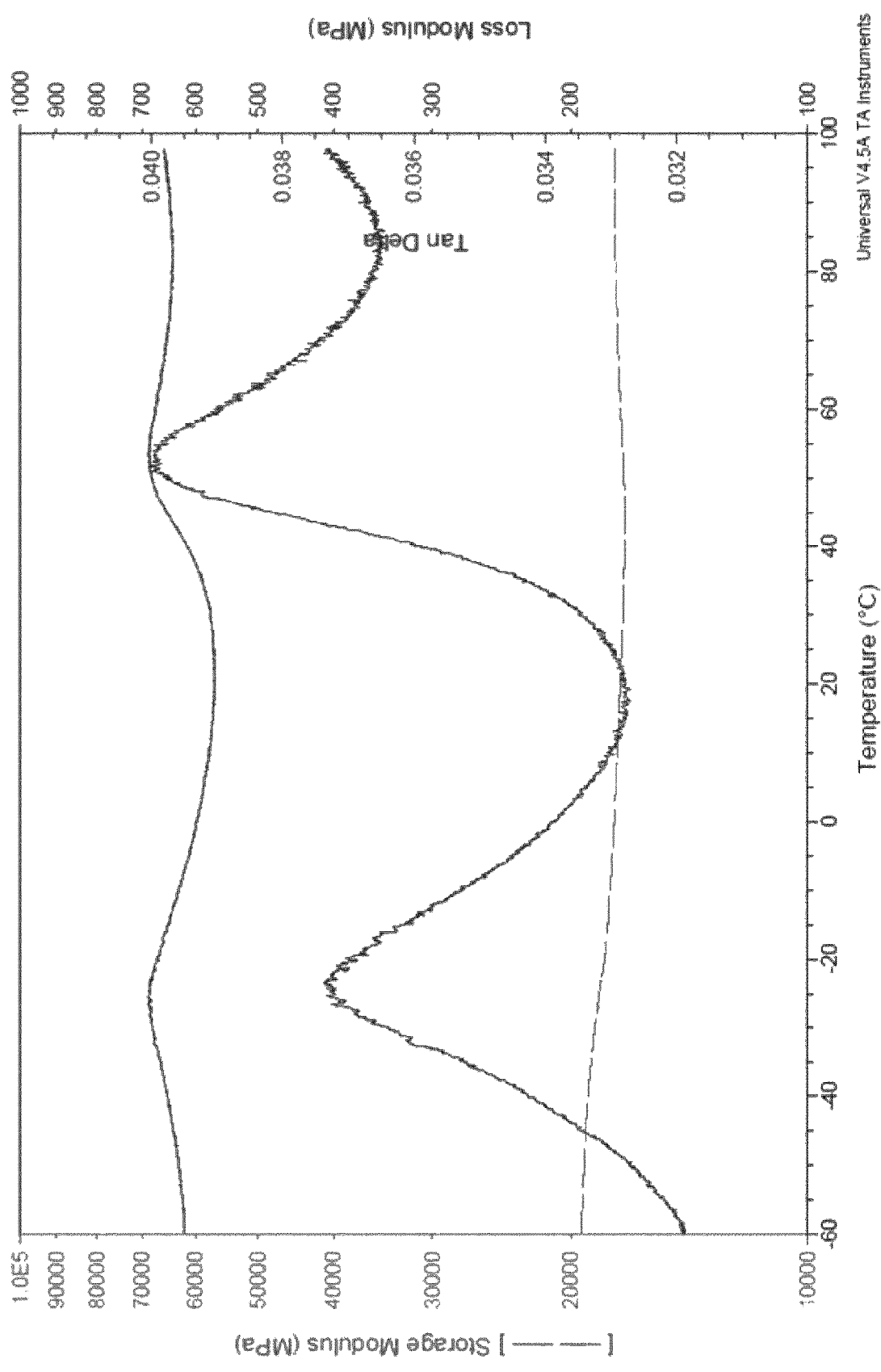

FIG. 17a for a sample of EVOH film with a size of 20×7×0.0130 mm,

FIG. 17b for a sample of Mylar film with a size of 22×7×0.0050 mm,

FIG. 17c for a sample for a sample of polyimide (PI) film with a size of 23×7×0.0130 mm, FIG. 17d for a sample of the P4 Warp tensile 3 with a size of 19×6×0.1020 mm.

The measurements showed that the EVOH, Mylar and PI films are stable at low temperatures without indicating low temperature weakness. For the EVOH film, this is surprising in view of the Zhai and Euler article discussed in the introduction. The Tan Delta curve indicates phase transitions, which for the films at low temperatures seem not to occur. For the laminates of Prototype P4, no evidence of delamination and neither physical damage was observed. It is believed that the heating of the fabric to 180° C. during processing leads to a cross-link the polymers into their final state in the fabric, which is advantageous for the stability.

CONCLUSIONS

Light weight laminate materials for the hull of high altitude lighter than air vehicles were developed, which have improved properties. The new laminate prototypes are not only significantly lighter than prior art laminates with similar tensile strength, but also significantly stronger than prior art laminates with the similar weight. The specific strength (strength-to-weight ratio) of the laminate prototypes is significantly higher than the current state-of-the-art. The laminates prototypes also have excellent resistance to thermal degradation, photo degradation, chemical resistance, especially against singlet oxygen and ozone, excellent gas barrier properties, and excellent resistance to creep elongation. Furthermore, the outermost film/layer also provide excellent thermal management, including low emissivity. Accordingly, the layered material has multi-functional properties at high level. The laminate design concept can be used to adjust the laminate materials to lower or higher weight while largely keeping the strength-to-weight ratio.

The invention claimed is:

1. A lighter-than-air vehicle comprising a hull, the hull comprising a laminate material as a gas barrier and load-bearing structure, the laminate material comprising a reinforcing fibre layer and a first ethylene vinyl alcohol, EVOH, film melt-bonded into the fibre layer on one side of the fibre layer, wherein the EVOH is in direct contact with the reinforcing fibre layer, wherein the laminate comprises a weathering layer melt-bonded to the first EVOH film, wherein the weathering layer comprises a metallized polymer film.

2. A lighter-than-air vehicle according to claim 1, wherein a second EVOH film is melt-bonded into the fibre layer on an opposite side of the fibre layer, wherein the EVOH of the second EVOH film is in direct contact with the reinforcing fibre layer.

3. A lighter-than-air vehicle according to claim 2, wherein the thickness of the second EVOH film is between 10 and 20 microns.

4. A lighter-than-air vehicle according to claim 2, the laminate material having a weight of between 85 and 120 gsm and comprising a reinforcing fibre layer made of Poly [p-phenylene-2, 6-benzobisoxazole] fibres, the weight of the fibre layer being between 40 and 70 gsm; and a first and second 10-15 micron thick EVOH film melt-bonded into the fibre layer on either side of the fibre layer; and a 10-15 micron thick polyimide film having a metallized side that is melt bonded to the first EVOH layer.

5. A lighter-than-air vehicle according to claim 4, further comprising a 4-12 micron thick metallized polymer film layer melt-bonded onto the second EVOH film on the opposite side of the laminate material relatively to the weathering layer.

6. A lighter-than-air vehicle according to claim 2, wherein the laminate comprises a metallized gas barrier layer melt-bonded onto the second EVOH film on the opposite side of the laminate relatively to the weathering layer.

7. A lighter-than-air vehicle according to claim 6, wherein the metallized gas barrier layer comprises a metallized polymer film that is melt bonded to the second EVOH film a metal layer on the opposite side of the metallized polymer film relatively to the second EVOH film.

8. A lighter-than-air vehicle according to claim 7, wherein the metallized polymer film layer is a polyethylene terephthalate, PET, layer with a thickness of between 2 and 6 microns.

9. A lighter-than-air vehicle according to claim 1, wherein the reinforcing fibre layer comprises fibres made of liquid crystal.

10. A lighter-than-air vehicle according to claim 9, wherein the liquid crystal is Poly [p-phenylene-2, 6-benzobisoxazole], PBO.

11. A lighter than air vehicle according to claim 9, wherein at least some of the liquid crystal fibres are twisted.

12. A lighter-than-air vehicle according to claim 11, wherein the twisted liquid crystal fibres comprise a twist of between 30 and 50 per meter.

13. A lighter-than-air vehicle according to claim 11, wherein the fibre layer comprises at least a first set of fibres and a second set of fibres, wherein the fibres in the first set of fibres are twisted liquid crystal fibres and oriented in a first direction, and wherein the fibres in the second set of fibres are non-twisted liquid crystal fibres and oriented in a second direction that is different from the first direction.

14. A lighter-than-air vehicle according to claim 13, wherein the first and the second direction have an angle between the directions of at least 30 degrees.

15. A lighter-than-air vehicle according to claim 13, wherein are first and the second directions are perpendicular.

16. A lighter-than-air vehicle according to claim 13, wherein the first set of fibres has a first thread density and the second set of fibres has a second thread density that differs from the first thread density by at least a factor of two.

17. A lighter-than-air vehicle according to claim 1, wherein the weight of the fibre layer is between 40 and 70 g per sqm.

18. A lighter-than-air vehicle according to claim 1, wherein the thickness of the first EVOH film is between 10 and 20 microns.

19. A lighter-than-air vehicle according to claim 1, wherein the metallized polymer film comprises a metal layer melt-bonded by and onto the first EVOH film layer.

20. A lighter-than-air vehicle according to claim 1, wherein the thickness of the weathering layer is between 10 and 20 microns.

21. A lighter-than-air vehicle according to claim 1, wherein the laminate has a weight of between 85 and 120 gsm.

22. A lighter-than-air vehicle according to claim 1, wherein the Tenacity-to-weight ratio for the laminate is above 890 kNm/kg.

23. A method of production of a lighter-than-air vehicle according to claim 1, the method comprising constructing a lighter-than-air vehicle hull, providing a reinforcing fibre layer and a first EVOH film on one side of the fibre layer or a first and a second EVOH film on either side of the fibre layer, and heat-pressing the layers together at a temperature of between 175° C. and 200° C. for melt-bonding.

* * * * *